United States Patent
Kocienda et al.

(10) Patent No.: US 11,917,286 B2
(45) Date of Patent: Feb. 27, 2024

(54) DISPLAYING IMAGES USING WEARABLE MULTIMEDIA DEVICES

(71) Applicant: Humane, Inc., San Francisco, CA (US)

(72) Inventors: Kenneth Luke Kocienda, Mill Valley, CA (US); Imran A. Chaudhri, San Francisco, CA (US)

(73) Assignee: Humane, Inc., San Francisco, CA (US)

( * ) Notice: Subject to any disclaimer, the term of this patent is extended or adjusted under 35 U.S.C. 154(b) by 0 days.

(21) Appl. No.: 17/687,597

(22) Filed: Mar. 4, 2022

(65) Prior Publication Data

US 2023/0283885 A1    Sep. 7, 2023

(51) Int. Cl.
| | |
|---|---|
| *H04N 5/232* | (2006.01) |
| *H04N 9/31* | (2006.01) |
| *H04N 23/63* | (2023.01) |
| *G06F 1/16* | (2006.01) |
| *H04N 23/61* | (2023.01) |
| *H04N 23/80* | (2023.01) |

(52) U.S. Cl.
CPC ........... *H04N 23/632* (2023.01); *G06F 1/163* (2013.01); *G06F 1/1686* (2013.01); *H04N 9/3179* (2013.01); *H04N 23/61* (2023.01); *H04N 23/80* (2023.01)

(58) Field of Classification Search
CPC ........ H04N 5/232935; H04N 5/23218; H04N 5/23229; H04N 9/3179; G06F 1/163; G06F 1/1686
See application file for complete search history.

(56) References Cited

U.S. PATENT DOCUMENTS

| | | | | |
|---|---|---|---|---|
| 2005/0088542 A1* | 4/2005 | Stavely | ................... | G06T 11/60 348/E5.042 |
| 2009/0162042 A1* | 6/2009 | Wexler | ............... | H04N 5/23222 396/49 |
| 2011/0292221 A1* | 12/2011 | Gu | ..................... | H04N 5/23222 348/207.1 |
| 2012/0092515 A1* | 4/2012 | Yim | ................. | H04N 5/232935 348/222.1 |
| 2014/0176732 A1* | 6/2014 | Cohen | ................. | H04N 5/2621 348/207.1 |

(Continued)

OTHER PUBLICATIONS

International Search Report and Written Opinion in International Appln. No. PCT/US2023/014488, dated Apr. 5, 2023, 10 pages.

(Continued)

*Primary Examiner* — Hung H Lam
(74) *Attorney, Agent, or Firm* — Fish & Richardson P.C.

(57) ABSTRACT

Systems, methods, devices and non-transitory, computer-readable storage mediums are disclosed for a wearable multimedia device and cloud computing platform with an application ecosystem for processing data captured by the wearable multimedia device. In an embodiment, operations performed by the wearable multimedia device or cloud computing platform include obtaining an image captured using a camera coupled to a wearable multimedia device; comparing the image to one or more known images; identifying one or more target features in the image; generating a new image comprising a portion of the image that includes the one or more target features; and providing the new image to the wearable multimedia device for presentation.

21 Claims, 12 Drawing Sheets

(56) References Cited

U.S. PATENT DOCUMENTS

| | | | | |
|---|---|---|---|---|
| 2016/0100101 A1* | 4/2016 | Cohen | ............... | H04N 5/23206 |
| | | | | 348/207.1 |
| 2019/0075254 A1* | 3/2019 | Jhawar | ............... | H04N 5/2621 |
| 2022/0076071 A1* | 3/2022 | Hiasa | ............... | G06K 9/6234 |

OTHER PUBLICATIONS

Kanel, "Sixth Sense Technology," Thesis for the Bachelor Degree of Engineering in Information and Technology, Centria University of Applied Sciences, May 2014, 46 pages.

Mann et al., "Telepointer: Hands-Free Completely Self Contained Wearable Visual Augmented Reality without Headwear and without any Infrastructural Reliance", IEEE Fourth International Symposium on Wearable Computers, Atlanta, GA, USA, Oct. 16-17, 2000, 4 pages.

Mann, "Wearable Computing: A First Step Toward Personal Imaging, " IEEE Computer, Feb. 1997, 30(2):25-32.

Mann, "Wearable, tetherless computer-mediated reality," American Association of Artificial Intelligence Technical Report, Feb. 1996, 62-69, 8 pages.

Metavision.com [online], "Sensularity with a Sixth Sense," available on or before Apr. 7, 2015, via Internet Archive: Wayback Machine URL <http://web.archive.org/web/20170901072037/https://blog.metavision.com/professor-steve-mann-society-of-sensularity-with-a-sixth-sense/> retrieved on Apr. 25, 2023, URL <https://blog.metavision.com/professor-steve-mann-society-of-sensularity-with-a-sixth-sense/>, 4 pages.

Mistry et al., "WUW—wear Ur world: a wearable gestural interface", Proceedings of the 27th international conference Extended Abstracts on Human Factors in Computing Systems—CHI EA '09, Boston, MA, USA, Apr. 4-9, 2009, 6 pages.

Shetty et al., "Sixth Sense Technology," International Journal of Science and Research, Dec. 2014, 3(12):1068-1073.

* cited by examiner

| Streams | Users | Userdevices | Devices |
|---|---|---|---|
| streamid | userid | userid | deviceid |
| deviceid | deviceid | deviceid | started |
| start | email | | state |
| end | fname | | modified |
| lat | lname | | created |
| lon | | | |
| attributes | | | |
| entities | | | |

| ProcessingResults | Entities | EntityTypes | EntityAssociations |
|---|---|---|---|
| streamid | entityID | person | entity 1 |
| ai | userid | place | entity 2 |
| result | entityName | thing | |
| callback | entityType | event | |
| duration | entityAttribute | | |
| accuracy | | | |

FIG. 5

DISPLAYING IMAGES USING WEARABLE MULTIMEDIA DEVICES

TECHNICAL FIELD

This disclosure relates generally to wearable multimedia devices, and in particular to displaying images using wearable multimedia devices.

BACKGROUND

High-precision laser scanners (e.g., MEMS scanners) have been developed that can turn any surface into a virtual interface (VI). For example, a laser projected VI can be projected onto the palm of a user's hand or other surface. Such a VI can be used with electronic devices.

SUMMARY

Systems, methods, devices and non-transitory, computer-readable storage media are disclosed for display and manipulation of images using wearable multimedia devices and associated network architecture. In some implementations, a user views images, interacts with displayed images, or controls of an image capture device, or any suitable combination of these, using a laser projected VI associated with a wearable multimedia device. The image capture device can be included in the wearable multimedia device.

In some implementations, interactions with images include cropping of images. Cropping can be directed based on reference images selected by a user or automated process. Cropping can include identifying one or more portions of an image that includes features similar to features selected by a user or automated process in the reference images. Cropped portions of images can be displayed using the VI of the wearable multimedia device.

In general, a wearable multimedia device can include a projector subsystem configured to present information visually to a user in the form of projected light. For example, the projector subsystem can project light onto a surface (e.g., a surface of a user's hand, such as the user's palm) according to a particular spatial and/or temporal pattern, such that the user perceives a VI with one or more user interface elements. Further, the user can perform gestures to interact with the VI.

In some implementations, a wearable multimedia device can present, using the VI, a camera interface that allows a user to view or interact with obtained images as well as capture an image or indicate, with a predetermined gesture, a selection, like, or dislike, of one or more images. This VI may also be referred to as a camera interface.

In some implementations, a wearable multimedia device is associated with a network-connected infrastructure that includes hardware or software components, or both, to generate one or more cropped images based on one or more images captured by an image capture device (e.g., a camera) included in the wearable multimedia device. In some implementations, the components include one or more network devices, which receive data from the wearable device to generate one or more cropped images based on images captured by the image capture device. For example, one such network device can include a processor to identify one or more portions of an image for cropping, and compare the one or more identified portions to known high-quality images. The processor can perform these operations by implementing instructions that extract one or more features from an identified portion of an image being processed, and one or more features from an image that is used as a reference. The processor can compare the features of the identified portion and the high quality image. Based on the comparison, such as the comparison satisfying a threshold, the processor can select the identified portion, and generate a cropped image based on content in the selected portion of the image.

In some implementations, the network-connected infrastructure includes a cloud computing architecture, and the network device can be a backend network devices connected over a network connection to the wearable multimedia device. For example, the network device can be a network server, which connects to the wearable multimedia device using a wired or wireless network.

In some implementations, the hardware and software components include one or more processors, and instructions encoded in storage media, on the wearable multimedia device itself. For example, a wearable multimedia device can include a processor and programs used to generate a cropped image.

In some implementations, the components for generating a cropped image include a cropping engine and a target feature engine. The cropping engine or the target feature engine, or both, can be programmed using software instructions, and implemented by executing the instructions using one or more processors. In some cases, the cropping engine or the target feature engine, or both, can be implemented using special purpose processors, which are realized, e.g., using application specific integrated circuits (ASICs) or Field-Programmable Gate Arrays (FPGAs), or other suitable hardware.

In the following sections, for ease of description, the innovative techniques are described with respect to a wearable multimedia device including an image capture device component (e.g., a camera), and a network server that is communicably coupled to the wearable multimedia device, the network server including a processor, and a cropping engine and a target feature engine that are realized by executing instructions using the processor. However, the techniques are equally applicable to other hardware and/or software components associated with a wearable multimedia device, e.g., including the components described above. For example, the techniques are applicable to implementations in which the processor, cropping engine and target feature engine are in the wearable multimedia device, which also includes an image capture device.

In some implementations, the target feature engine can obtain one or more target images selected by a user or automated process, and generate one or more features based on the selected target images. The target feature engine can provide the generated features to the cropping engine. The cropping engine can obtain new images and determine, based on the features, what portion of the new images to crop. In general, the cropping engine can identify portions of images that include similar features compared to the selected target images.

In some implementations, a processor that is used to generate a cropped image obtains data from one or more of sensors on board a wearable multimedia device, or from other connected network devices, such as network database storage. The processor can generate one or more cropped images based on the obtained data. Depending on implementation, the processor can execute instructions corresponding to a machine learning model. The machine learning model (also referred to simply as a model) can include one or more of: an offline trained model, or a trained model in a cloud computing architecture. Additionally or alternatively, the processor can execute instructions corresponding to offline algorithms or cloud-based program algorithms, or a combination of offline trained models, trained models in a cloud computing architecture, and offline or cloud-based program algorithms.

In some implementations, the processor provides images to a model trained to determine the quality of an image. For example, a model can be trained using training data indicating images marked by a user or algorithm as high-quality, such as images that are in focus, feature persons prominently, have subjects in focus, provide natural lighting and coloring, among others, and images marked by a user or algorithm as low quality, such as images that are not in focus, have poor focus, color, or lighting, among others. The model can also be trained based on a user's selection of images. The model can be trained to generate images with similar features compared to a selection of images selected by the user, a trained model, or algorithm.

The implementations described herein can provide various technical benefits. For instance, a system that employs one or more backend network server processors in a network-connected infrastructure for generating cropped images, can reduce processing or storage requirements, or both, on a wearable multimedia device. A system can also increase the quality of images by automatically obtaining images that include noteworthy or interesting events according to the preferences of one or more users. For example, by cropping a portion of a larger image, which may include one or more features inconsistent with a reference image, to include objects or subjects with features consistent with features of reference images, such as reference images selected by one or more users, the system can increase the quality of the images obtained for the user by reducing the visibility of unsightly or otherwise unwanted features in the captured images and focusing on features that appear in reference or target images.

In some cases, the disclosed techniques can lower the amount of storage needed for images by enabling storing of portions of images. For example, instead of storing the entirety of an image captured by an image capture device, only a cropped portion that includes content of interest, can be stored. In this manner, storage used in the wearable multimedia device, or in backend servers, or both, can be less. By reducing the size of images, through cropping, a system that implements the disclosed techniques, can reduce the storage requirements of a wearable device while retaining high quality images.

In some case, the disclosed techniques can reduce processing power expenditure of a wearable device. For example, by reducing the size of images captured to only those portions of the image that represent objects or persons of interest as well as noteworthy or interesting events, the system can reduce processing power that would have been required for processing the entire image during subsequent viewing, sharing, or storage.

In some cases, the disclosed techniques can further save time that would otherwise be spent adjusting captured images. For example, by automatically cropping images, the disclosed techniques can save time manually spent processing an image to retain portions that include content of interest.

One innovative aspect of the subject matter described in this specification is embodied in a method that includes obtaining an image captured using a camera coupled to a wearable multimedia device; comparing the image to one or more known images; based on comparing the image to the one or more known images, identifying one or more target features in the image; generating a new image including a portion of the image that includes the one or more target features; and providing the new image to the wearable multimedia device for presentation on a display associated with the wearable multimedia device.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The foregoing and other embodiments can each optionally include one or more of the following features, alone or in combination. For instance, in some implementations, actions include, based on comparing the image to the one or more known images, determining a matching image of the one or more known images that best matches the image captured using the camera; identifying one or more features in the matching image; and, based on identifying the one or more features in the matching image, identifying the one or more target features in the image, where at least one of the one or more target features is a feature of the one or more features in the matching image.

In some implementations, determining the matching image of the one or more known images that best matches the image captured using the camera includes comparing the one or more features of the matching image to the one or more target features in the image.

In some implementations, the one or more known images includes a reference image designated by a user of the wearable multimedia device.

In some implementations, the one or more target features include one or more features within the reference image, and the actions include, based at least on receiving a designation of the reference image by the user of the wearable multimedia device, analyzing the reference image; identifying, based on the analysis, one or more features in the reference image; for each feature of the one or more features: determining one or more parameters; comparing the one or more parameters to respective threshold values; and upon determining that the one or more parameters satisfy the respective threshold values, selecting the feature as a target feature.

In some implementations, the one or more parameters include a focus level.

In some implementations, the one or more target features include a representation of an object.

In some implementations, the object includes one or more of a human, animal, or vehicle.

In some implementations, providing the new image for display includes: projecting, using a laser projector of the wearable multimedia device, the new image on a display surface that is physically detached from the wearable multimedia device.

In some implementations, the display surface includes one of a surface of a hand of a user, a palm of a user, a wrist of a user, a tabletop, a wall, a portion of glass, a portion of ground.

In some implementations, the computing device is a server that is communicably coupled to the wearable multimedia device.

In some implementations, the computing device is the wearable multimedia device.

In some implementations, actions include generating a higher resolution version of the image captured using the camera coupled to the wearable multimedia device.

In some implementations, generating the higher resolution version of the image includes providing the image to a machine learning model; and generating the higher resolution version of the image based on obtained output from the machine learning model.

The details of the disclosed embodiments are set forth in the accompanying drawings and the description below. Other features, objects and advantages are apparent from the description, drawings and claims.

DESCRIPTION OF DRAWINGS

FIG. 5 illustrates data objects used by the data processing system of FIG. 2, according to an embodiment.

The same reference symbol used in various drawings indicates like elements.

DETAILED DESCRIPTION

Example Wearable Multimedia Device

Figure 1:
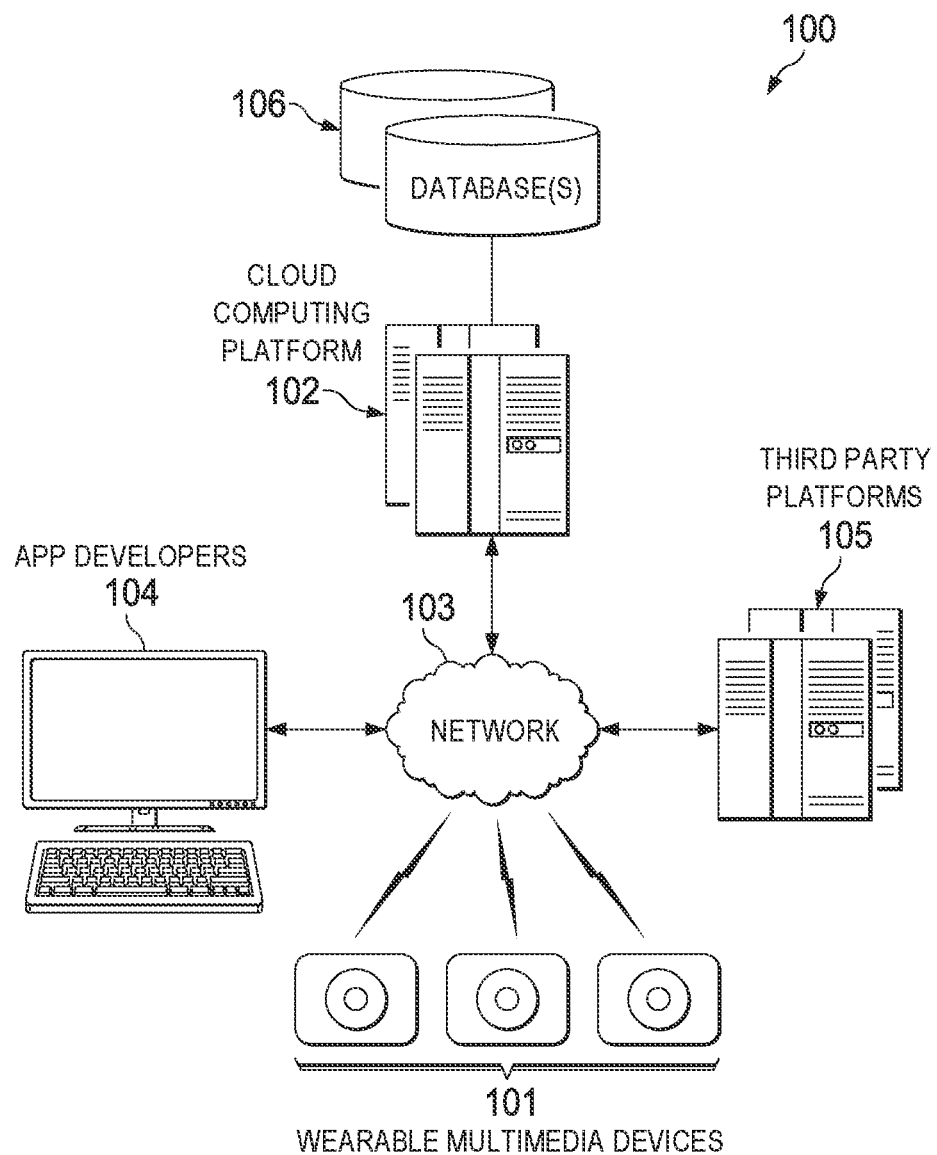
FIG. 1 is a block diagram of an operating environment for a wearable multimedia device and cloud computing platform with an application ecosystem for processing multimedia data captured by the wearable multimedia device, according to an embodiment

The features and processes described herein can be implemented on a wearable multimedia device. In an embodiment, the wearable multimedia device is a lightweight, small form factor, battery-powered device that can be attached to a user's clothing or an object using a tension clasp, interlocking pin back, magnet, or any other attachment mechanism. The wearable multimedia device includes a digital image capture device (e.g., a camera with a 180° FOV with optical image stabilizer (OIS)) that allows a user to spontaneously and/or continuously capture multimedia data (e.g., video, audio, depth data, biometric data) of life events ("moments") and document transactions (e.g., financial transactions) with minimal user interaction or device set-up.

The multimedia data ("context data") captured by the wireless multimedia device is uploaded to a cloud computing platform with an application ecosystem that allows the context data to be processed, edited and formatted by one or more applications (e.g., Artificial Intelligence (AI) applications) into any desired presentation format (e.g., single image, image stream, video clip, audio clip, multimedia presentation, image gallery) that can be downloaded and replayed on the wearable multimedia device and/or any other playback device. For example, the cloud computing platform can transform video data and audio data into any desired filmmaking style (e.g., documentary, lifestyle, candid, photojournalism, sport, street) specified by the user.

In an embodiment, the context data is processed by server computer(s) of the cloud computing platform based on user preferences. For example, images can be color graded, stabilized and cropped perfectly to the moment the user wants to relive based on the user preferences. The user preferences can be stored in a user profile created by the user through an online account accessible through a website or portal, or the user preferences can be learned by the platform over time (e.g., using machine learning). In an embodiment, the cloud computing platform is a scalable distributed computing environment. For example, the cloud computing platform can be a distributed streaming platform (e.g., Apache Kafka™) with real-time streaming data pipelines and streaming applications that transform or react to streams of data.

In an embodiment, the user can start and stop a context data capture session on the wearable multimedia device with a simple touch gesture (e.g., a tap or swipe), by speaking a command or any other input mechanism. All or portions of the wearable multimedia device can automatically power down when it detects that it is not being worn by the user using one or more sensors (e.g., proximity sensor, optical sensor, accelerometers, gyroscopes).

The context data can be encrypted and compressed and stored in an online database associated with a user account using any desired encryption or compression technology. The context data can be stored for a specified period of time that can be set by the user. The user can be provided through a website, portal or mobile application with opt-in mechanisms and other tools for managing their data and data privacy.

In an embodiment, the context data includes point cloud data to provide three-dimensional (3D) surface mapped objects that can be processed using, for example, augmented reality (AR) and virtual reality (VR) applications in the application ecosystem. The point cloud data can be generated by a depth sensor (e.g., LiDAR or Time of Flight (TOF)) embedded on the wearable multimedia device.

In an embodiment, the wearable multimedia device includes a Global Navigation Satellite System (GNSS) receiver (e.g., Global Positioning System (GPS)) and one or more inertial sensors (e.g., accelerometers, gyroscopes) for determining the location and orientation of the user wearing the device when the context data was captured. In an embodiment, one or more images in the context data can be used by a localization application, such as a visual odometry application, in the application ecosystem to determine the position and orientation of the user.

In an embodiment, the wearable multimedia device can also include one or more environmental sensors, including but not limited to: an ambient light sensor, magnetometer, pressure sensor, voice activity detector, etc. This sensor data can be included in the context data to enrich a content presentation with additional information that can be used to capture the moment.

In an embodiment, the wearable multimedia device can include one or more biometric sensors, such as a heart rate sensor, fingerprint scanner, etc. This sensor data can be included in the context data to document a transaction or to indicate the emotional state of the user during the moment (e.g., elevated heart rate could indicate excitement or fear).

In an embodiment, the wearable multimedia device includes a headphone jack connecting a headset or earbuds, and one or more microphones for receiving voice command and capturing ambient audio. In an alternative embodiment, the wearable multimedia device includes short range communication technology, including but not limited to Bluetooth, IEEE 802.15.4 (ZigBee™) and near field communications (NFC). The short range communication technology can be used to wirelessly connect to a wireless headset or earbuds in addition to, or in place of the headphone jack, and/or can wirelessly connect to any other external device (e.g., a computer, printer, projector, television and other wearable devices).

In an embodiment, the wearable multimedia device includes a wireless transceiver and communication protocol stacks for a variety of communication technologies, including Wi-Fi, 3G, 4G and 5G communication technologies. In an embodiment, the headset or earbuds also include sensors (e.g., biometric sensors, inertial sensors) that provide information about the direction the user is facing, to provide commands with head gestures or playback of spatial audio, etc. In an embodiment, the camera direction can be controlled by the head gestures, such that the camera view follows the user's view direction. In an embodiment, the wearable multimedia device can be embedded in or attached to the user's glasses.

In an embodiment, the wearable multimedia device includes a projector (e.g., a laser projector) or other digital projection technology (e.g., Liquid Crystal on Silicon (LCoS or LCOS), Digital Light Processing (DLP) or Liquid Chrystal Display (LCD) technology), or can be wired or wirelessly coupled to an external projector, that allows the user to replay a moment on a surface such as a wall or table top or on a surface of the user's hand (e.g., the user's palm). In another embodiment, the wearable multimedia device includes an output port that can connect to a projector or other output device.

In an embodiment, the wearable multimedia capture device includes a touch surface responsive to touch gestures (e.g., a tap, multi-tap or swipe gesture). The wearable multimedia device may include a small display for presenting information and one or more light indicators to indicate on/off status, power conditions or any other desired status.

In an embodiment, the cloud computing platform can be driven by context-based gestures (e.g., air gesture) in combination with speech queries, such as the user pointing to an object in their environment and saying: "What is that building?" The cloud computing platform uses the air gesture to narrow the scope of the viewport of the camera and isolate the building. One or more images of the building are captured and optionally cropped (e.g., to protect privacy) and sent to the cloud computing platform where an image recognition application can run an image query and store or return the results to the user. Air and touch gestures can also be performed on a projected ephemeral display, for example, responding to user interface elements projected on a surface.

In an embodiment, the context data can be encrypted on the device and on the cloud computing platform so that only the user or any authorized viewer can relive the moment on a connected screen (e.g., smartphone, computer, television, etc.) or as a projection on a surface. An example architecture for the wearable multimedia device is described in reference to FIG. 8.

In addition to personal life events, the wearable multimedia device simplifies the capture of financial transactions that are currently handled by smartphones. The capture of every day transactions (e.g., business transactions, micro transactions) is made simpler, faster and more fluid by using sight assisted contextual awareness provided by the wearable multimedia device. For example, when the user engages in a financial transaction (e.g., making a purchase), the wearable multimedia device will generate data memorializing the financial transaction, including a date, time, amount, digital images or video of the parties, audio (e.g., user commentary describing the transaction) and environment data (e.g., location data). The data can be included in a multimedia data stream sent to the cloud computing platform, where it can be stored online and/or processed by one or more financial applications (e.g., financial management, accounting, budget, tax preparation, inventory, etc.).

In an embodiment, the cloud computing platform provides graphical user interfaces on a website or portal that allow various third party application developers to upload, update and manage their applications in an application ecosystem. Some example applications can include but are not limited to: personal live broadcasting (e.g., Instagram™ Life, Snapchat™), senior monitoring (e.g., to ensure that a loved one has taken their medicine), memory recall (e.g., showing a child's soccer game from last week) and personal guide (e.g., AI enabled personal guide that knows the location of the user and guides the user to perform an action).

In an embodiment, the wearable multimedia device includes one or more microphones and a headset. In some embodiments, the headset wire includes the microphone. In an embodiment, a digital assistant is implemented on the wearable multimedia device that responds to user queries, requests and commands. For example, the wearable multimedia device worn by a parent captures moment context data for a child's soccer game, and in particular a "moment" where the child scores a goal. The user can request (e.g., using a speech command) that the platform create a video clip of the goal and store it in their user account. Without any further actions by the user, the cloud computing platform identifies the correct portion of the moment context data (e.g., using face recognition, visual or audio cues) when the goal is scored, edits the moment context data into a video clip, and stores the video clip in a database associated with the user account.

In an embodiment, the device can include photovoltaic surface technology to sustain battery life and inductive charging circuitry (e.g., Qi) to allow for inductive charging on charge mats and wireless over-the-air (OTA) charging.

In an embodiment, the wearable multimedia device is configured to magnetically couple or mate with a rechargeable portable battery pack. The portable battery pack includes a mating surface that has permanent magnet (e.g., N pole) disposed thereon, and the wearable multimedia device has a corresponding mating surface that has permanent magnet (e.g., S pole) disposed thereon. Any number of permanent magnets having any desired shape or size can be arranged in any desired pattern on the mating surfaces.

The permanent magnets hold portable battery pack and wearable multimedia device together in a mated configuration with clothing (e.g., a user's shirt) in between. In an embodiment, the portable battery pack and wearable multimedia device have the same mating surface dimensions, such that there is no overhanging portions when in a mated configuration. A user magnetically fastens the wearable multimedia device to their clothing by placing the portable battery pack underneath their clothing and placing the wearable multimedia device on top of portable battery pack outside their clothing, such that permanent magnets attract each other through the clothing.

In an embodiment, the portable battery pack has a built-in wireless power transmitter which is used to wirelessly power the wearable multimedia device while in the mated configuration using the principle of resonant inductive coupling. In an embodiment, the wearable multimedia device includes a built-in wireless power receiver which is used to receive power from the portable battery pack while in the mated configuration.

System Overview

FIG. 1 is a block diagram of an operating environment for a wearable multimedia device and cloud computing platform with an application ecosystem for processing multimedia data captured by the wearable multimedia device, according to an embodiment. Operating environment 100 includes wearable multimedia devices 101, cloud computing platform 102, network 103, application ("app") developers 104 and third party platforms 105. Cloud computing platform 102 is coupled to one or more databases 106 for storing context data uploaded by wearable multimedia devices 101.

As previously described, wearable multimedia devices 101 are lightweight, small form factor, battery-powered devices that can be attached to a user's clothing or an object using a tension clasp, interlocking pin back, magnet or any other attachment mechanism. Wearable multimedia devices 101 include a digital image capture device (e.g., a camera with a 180° FOV and OIS) that allows a user to spontaneously capture multimedia data (e.g., video, audio, depth data) of "moments" and document every day transactions (e.g., financial transactions) with minimal user interaction or device set-up. The context data captured by wireless multimedia devices 101 are uploaded to cloud computing platform 102. Cloud computing platform 102 includes an application ecosystem that allows the context data to be processed, edited and formatted by one or more server side applications into any desired presentation format (e.g., single image, image stream, video clip, audio clip, multimedia presentation, images gallery) that can be downloaded and replayed on the wearable multimedia device and/or other playback device.

By way of example, at a child's birthday party a parent can clip the wearable multimedia device on their clothing (or attached the device to a necklace or chain and wear around their neck) so that the camera lens is facing in their view direction. The camera includes a 180° FOV that allows the camera to capture almost everything that the user is currently seeing. The user can start recording by simply tapping the surface of the device or pressing a button or speaking a command. No additional set-up is required. A multimedia data stream (e.g., video with audio) is recorded that captures the special moments of the birthday (e.g., blowing out the candles). This "context data" is sent to cloud computing platform 102 in real-time through a wireless network (e.g., Wi-Fi, cellular). In an embodiment, the context data is stored on the wearable multimedia device so that it can be uploaded at a later time. In another embodiment, the user can transfer the context data to another device (e.g., personal computer hard drive, smartphone, tablet computer, thumb drive) and upload the context data to cloud computing platform 102 at a later time using an application.

In an embodiment, the context data is processed by one or more applications of an application ecosystem hosted and managed by cloud computing platform 102. Applications can be accessed through their individual application programming interfaces (APIs). A custom distributed streaming pipeline is created by cloud computing platform 102 to process the context data based on one or more of the data type, data quantity, data quality, user preferences, templates and/or any other information to generate a desired presentation based on user preferences. In an embodiment, machine learning technology can be used to automatically select suitable applications to include in the data processing pipeline with or without user preferences. For example, historical user context data stored in a database (e.g., NoSQL database) can be used to determine user preferences for data processing using any suitable machine learning technology (e.g., deep learning or convolutional neural networks).

In an embodiment, the application ecosystem can include third party platforms 105 that process context data. Secure sessions are set-up between cloud computing platform 102 and third party platforms 105 to send/receive context data. This design allows third party app providers to control access to their application and to provide updates. In other embodiments, the applications are run on servers of cloud computing platform 102 and updates are sent to cloud computing platform 102. In the latter embodiment, app developers 104 can use an API provided by cloud computing platform 102 to upload and update applications to be included in the application ecosystem.

Example Data Processing System

Figure 2:
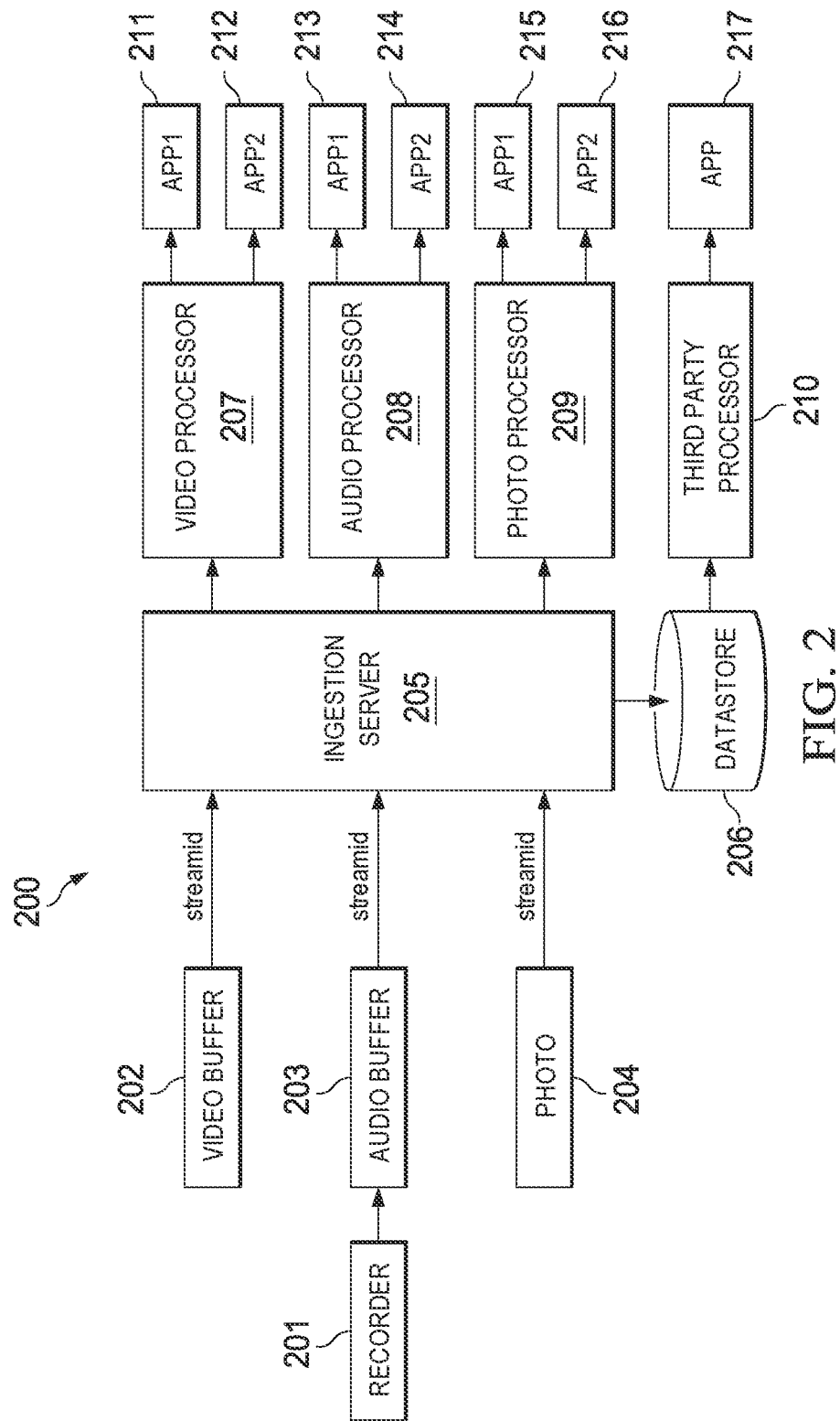
FIG. 2 is a block diagram of a data processing system implemented by the cloud computing platform of FIG. 1, according to an embodiment.

FIG. 2 is a block diagram of a data processing system implemented by the cloud computing platform of FIG. 1, according to an embodiment. Data processing system 200 includes recorder 201, video buffer 202, audio buffer 203, photo buffer 204, ingestion server 205, data store 206, video processor 207, audio processor 208, photo processor 209 and third party processor 210.

A recorder 201 (e.g., a software application) running on a wearable multimedia device records video, audio and photo data ("context data") captured by a camera and audio subsystem, and stores the data in buffers 202, 203, 204, respectively. This context data is then sent (e.g., using wireless OTA technology) to ingestion server 205 of cloud computing platform 102. In an embodiment, the data can be sent in separate data streams each with a unique stream identifier (streamid). The streams are discrete pieces of data that may contain the following example attributes: location (e.g., latitude, longitude), user, audio data, video stream of varying duration and N number of photos. A stream can have a duration of 1 to MAXSTREAM_LEN seconds, where in this example MAXSTREAM_LEN=20 seconds.

Ingestion server 205 ingests the streams and creates a stream record in data store 206 to store the results of processors 207-209. In an embodiment, the audio stream is processed first and is used to determine the other streams that are needed. Ingestion server 205 sends the streams to the appropriate processor 207-209 based on streamid. For example, the video stream is sent to video processor 207, the audio stream is sent to audio processor 208 and the photo stream is sent to photo processor 209. In an embodiment, at least a portion of data collected from the wearable multimedia device (e.g., image data) is processed into metadata and encrypted so that it can be further processed by a given application and sent back to the wearable multimedia device or other device.

Processors 207-209 can run proprietary or third party applications as previously described. For example, video processor 207 can be a video processing server that sends raw video data stored in video buffer 202 to a set of one or more image processing/editing applications 211, 212 based on user preferences or other information. Processor 207 sends requests to applications 211, 212, and returns the results to ingestion server 205. In an embodiment, third party processor 210 can process one or more of the streams using its own processor and application. In another example, audio processor 208 can be an audio processing server that sends speech data stored in audio buffer 203 to a speech-to-text converter application 213.

Example Scene Identification Application

Figure 3:
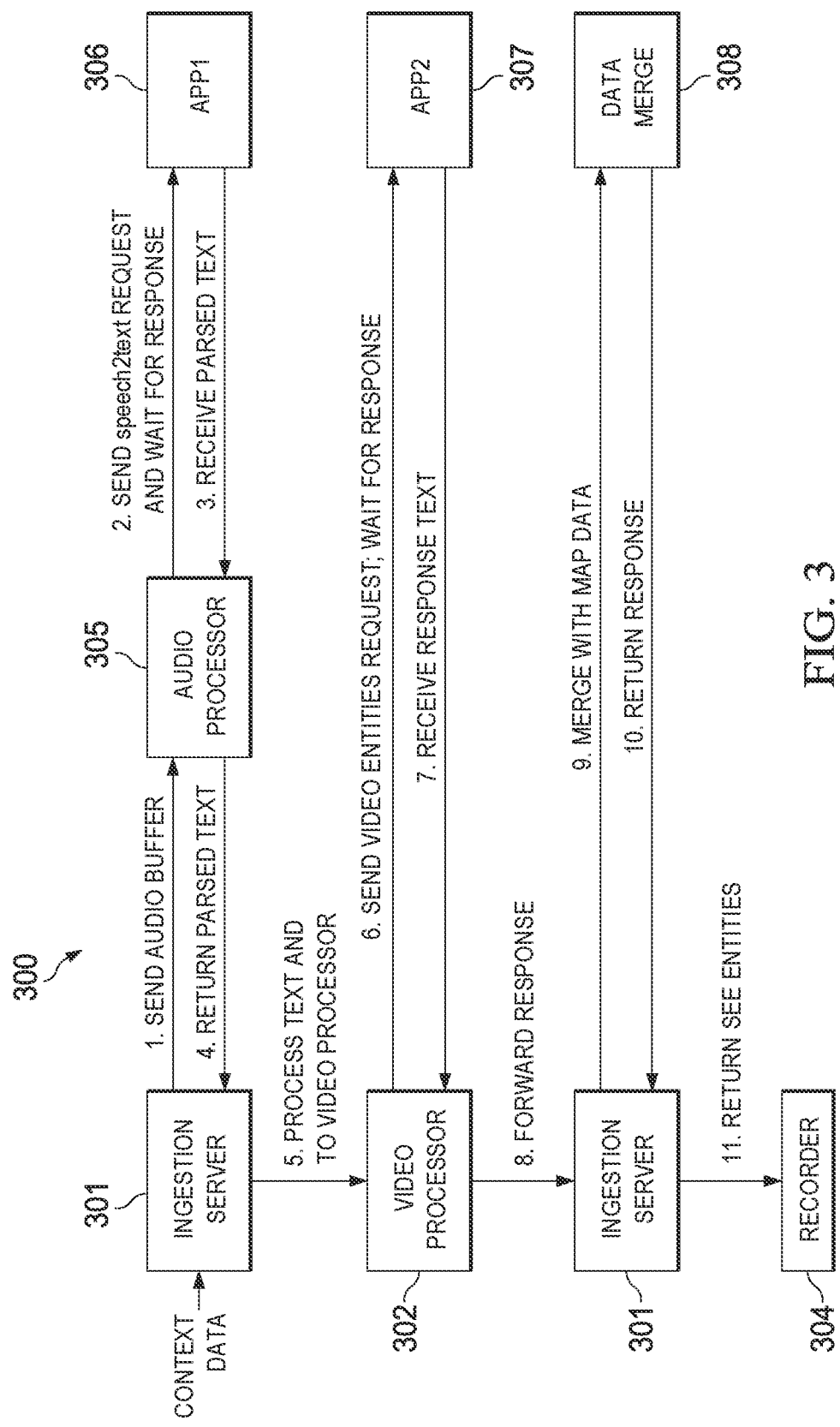
FIG. 3 is a block diagram of a data processing pipeline for processing a context data stream, according to an embodiment.

FIG. 3 is a block diagram of a data processing pipeline for processing a context data stream, according to an embodiment. In this embodiment, data processing pipeline 300 is created and configured to determine what the user is seeing based on the context data captured by a wearable multimedia device worn by the user. Ingestion server 301 receives an audio stream (e.g., including user commentary) from audio buffer 203 of wearable multimedia device and sends the audio stream to audio processor 305. Audio processor 305 sends the audio stream to app 306 which performs speech-to-text conversion and returns parsed text to audio processor 305. Audio processor 305 returns the parsed text to ingestion server 301.

Video processor 302 receives the parsed text from ingestion server 301 and sends a requests to video processing app 307. Video processing app 307 identifies objects in the video scene and uses the parsed text to label the objects. Video processing app 307 sends a response describing the scene (e.g., labeled objects) to video processor 302. Video processor then forwards the response to ingestion server 301. Ingestion server 301 sends the response to data merge process 308, which merges the response with the user's location, orientation and map data. Data merge process 308 returns a response with a scene description to recorder 304 on the wearable multimedia device. For example, the response can include text describing the scene as the child's birthday party, including a map location and a description of objects in the scene (e.g., identify people in the scene). Recorder 304 associates the scene description with the multimedia data (e.g., using a streamid) stored on the wearable multimedia device. When the user recalls the data, the data is enriched with the scene description.

In an embodiment, data merge process 308 may use more than just location and map data. There can also be a notion of ontology. For example, the facial features of the user's Dad captured in an image can be recognized by the cloud computing platform, and be returned as "Dad" rather than the user's name, and an address such as "555 Main Street, San Francisco, Calif." can be returned as "Home." The ontology can be specific to the user and can grow and learn from the user's input.

Example Transportation Application

Figure 4:
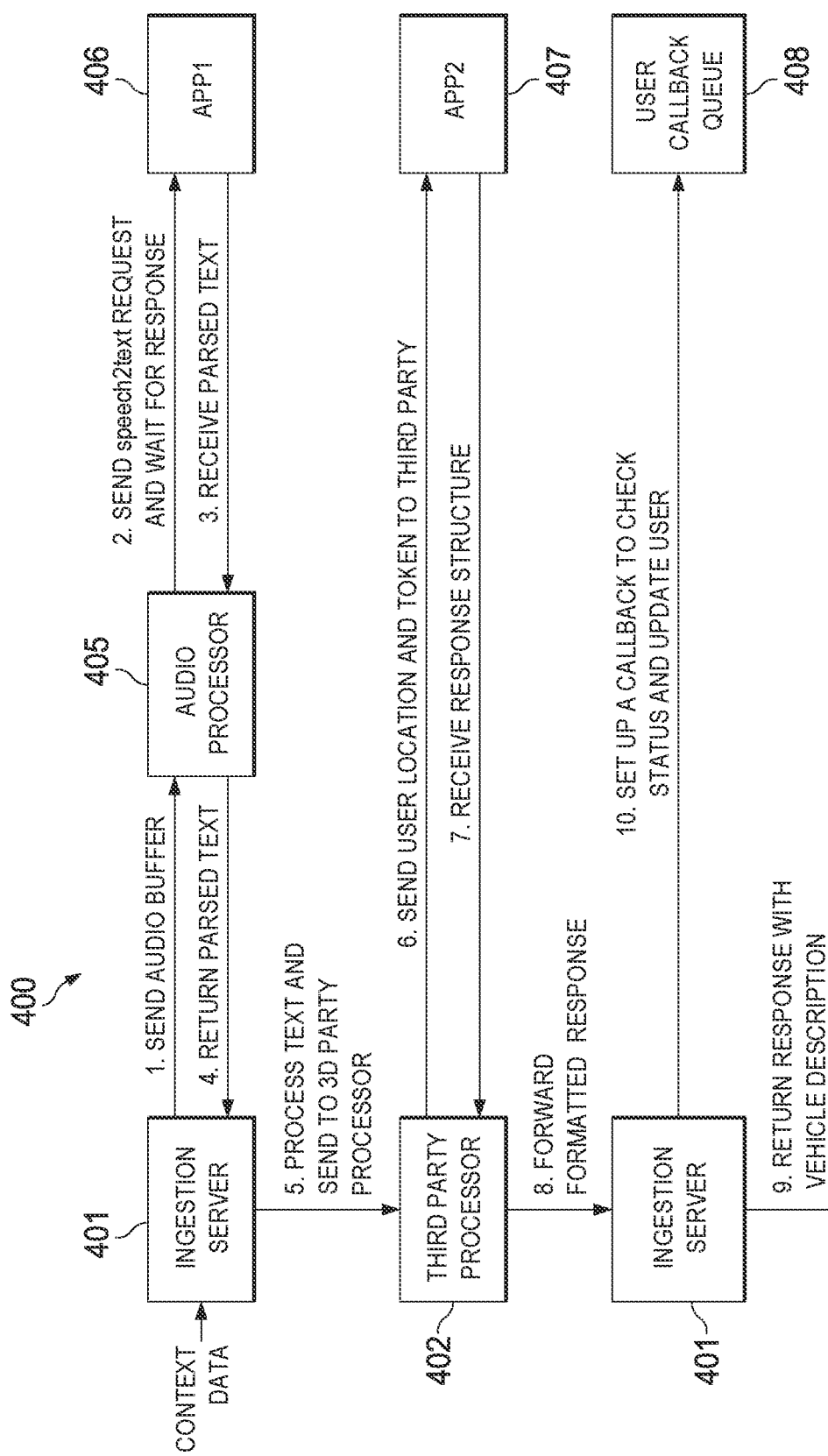
FIG. 4 is a block diagram of another data processing for processing a context data stream for a transportation application, according to an embodiment.

FIG. 4 is a block diagram of another data processing for processing a context data stream for a transportation application, according to an embodiment. In this embodiment, data processing pipeline 400 is created to call a transportation company (e.g., Uber®, Lyft®) to get a ride home. Context data from a wearable multimedia device is received by ingestion server 401 and an audio stream from an audio buffer 203 is sent to audio processor 405. Audio processor 405 sends the audio stream to app 406, which converts the speech to text. The parsed text is returned to audio processor 405, which returns the parsed text to ingestion server 401 (e.g., a user speech request for transportation). The processed text is sent to third party processor 402. Third party processor 402 sends the user location and a token to a third party application 407 (e.g., Uber® or Lyft™®) application). In an embodiment, the token is an API and authorization token used to broker a request on behalf of the user. Application 407 returns a response data structure to third party processor 402, which is forwarded to ingestion server 401. Ingestion server 401 checks the ride arrival status (e.g., ETA) in the response data structure and sets up a callback to the user in user callback queue 408. Ingestion server 401 returns a response with a vehicle description to recorder 404, which can be spoken to the user by a digital assistant through a loudspeaker on the wearable multimedia device, or through the user's headphones or earbuds via a wired or wireless connection.

FIG. 5 illustrates data objects used by the data processing system of FIG. 2, according to an embodiment. The data objects are part of software component infrastructure instantiated on the cloud computing platform. A "streams" object includes the data streamid, deviceid, start, end, lat, lon, attributes and entities. "Streamid" identifies the stream (e.g., video, audio, photo), "deviceid" identifies the wearable multimedia device (e.g., a mobile device ID), "start" is the start time of the context data stream, "end" is the end time of the context data stream, "lat" is the latitude of the wearable multimedia device, "lon" is the longitude of the wearable multimedia device, "attributes" include, for example, birthday, facial points, skin tone, audio characteristics, address, phone number, etc., and "entities" make up an ontology. For example, the name "John Do" would be mapped to "Dad" or "Brother" depending on the user.

A "Users" object includes the data userid, deviceid, email, fname and lname. Userid identifies the user with a unique identifier, deviceid identifies the wearable device with a unique identifier, email is the user's registered email address, fname is the user's first name and lname is the user's last name. A "Userdevices" object includes the data userid and deviceid. A "devices" object includes the data deviceid, started, state, modified and created. In an embodiment, deviceid is a unique identifier for the device (e.g., distinct from a MAC address). Started is when the device was first started. State is on/off/sleep. Modified is the last modified date, which reflects the last state change or operating system (OS) change. Created is the first time the device was turned on.

A "ProcessingResults" object includes the data streamid, ai, result, callback, duration an accuracy. In an embodiment, streamid is each user stream as a Universally Unique Identifier (UUID). For example, a stream that was started from 8:00 AM to 10:00 AM will have id:15h158dhb4 and a stream that starts from 10:15 AM to 10:18 AM will have a UUID that was contacted for this stream. AI is the identifier for the platform application that was contacted for this stream. Result is the data sent from the platform application. Callback is the callback that was used (versions can change hence the callback is tracked in case the platform needs to replay the request). Accuracy is the score for how accurate the result set is. In an embodiment, processing results can be used for multiple tasks, such as 1) to inform the merge server of the full set of results, 2) determine the fastest AI so that user experience can be enhanced, and 3) determine the most accurate ai. Depending on the use case, one may favor speed over accuracy or vice versa.

An "Entities" object includes the data entityID, userID, entityName, entityType and entityAttribute. EntityID is a UUID for the entity and an entity having multiple entries where the entityID references the one entity. For example, "Barack Obama" would have an entityID of 144, which could be linked in an associations table to POTUS44 or "Barack Hussein Obama" or "President Obama." UserID identifies the user that the entity record was made for. EntityName is the name that the userID would call the entity. For example, Malia Obama's entityName for entityID 144 could be "Dad" or "Daddy." EntityType is a person, place or thing. EntityAttribute is an array of attributes about the entity that are specific to the userID's understanding of that entity. This maps entities together so that when, for example, Malia makes the speech query: "Can you see Dad?", the cloud computing platform can translate the query to Barack Hussein Obama and use that in brokering requests to third parties or looking up information in the system.

Example Processes

Figure 6:
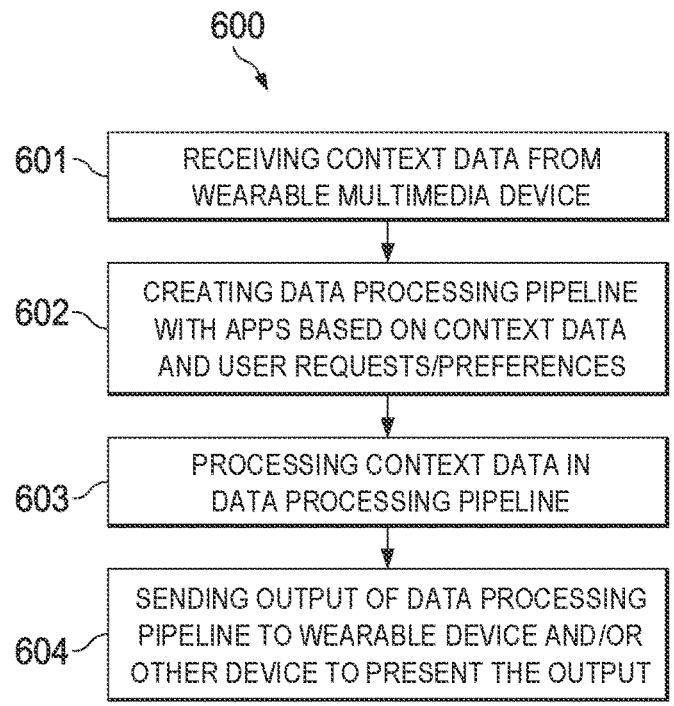
FIG. 6 is flow diagram of a data pipeline process, according to an embodiment.

FIG. 6 is flow diagram of a data pipeline process, according to an embodiment. Process 600 can be implemented using wearable multimedia devices 101 and cloud computing platform 102 described in reference to FIGS. 1-5.

Process 600 can begin by receiving context data from a wearable multimedia device (601). For example, the context data can include video, audio and still images captured by a camera and audio subsystem of the wearable multimedia device.

Process 600 can continue by creating (e.g., instantiating) a data processing pipeline with applications based on the context data and user requests/preferences (602). For example, based on user requests or preferences, and also based on the data type (e.g., audio, video, photo), one or more applications can be logically connected to form a data processing pipeline to process the context data into a presentation to be playback on the wearable multimedia device or another device.

Process 600 can continue by processing the context data in the data processing pipeline (603). For example, speech from user commentary during a moment or transaction can be converted into text, which is then used to label objects in a video clip.

Process 600 can continue by sending the output of the data processing pipeline to the wearable multimedia device and/or other playback device (604).

Example Cloud Computing Platform Architecture

Figure 7:
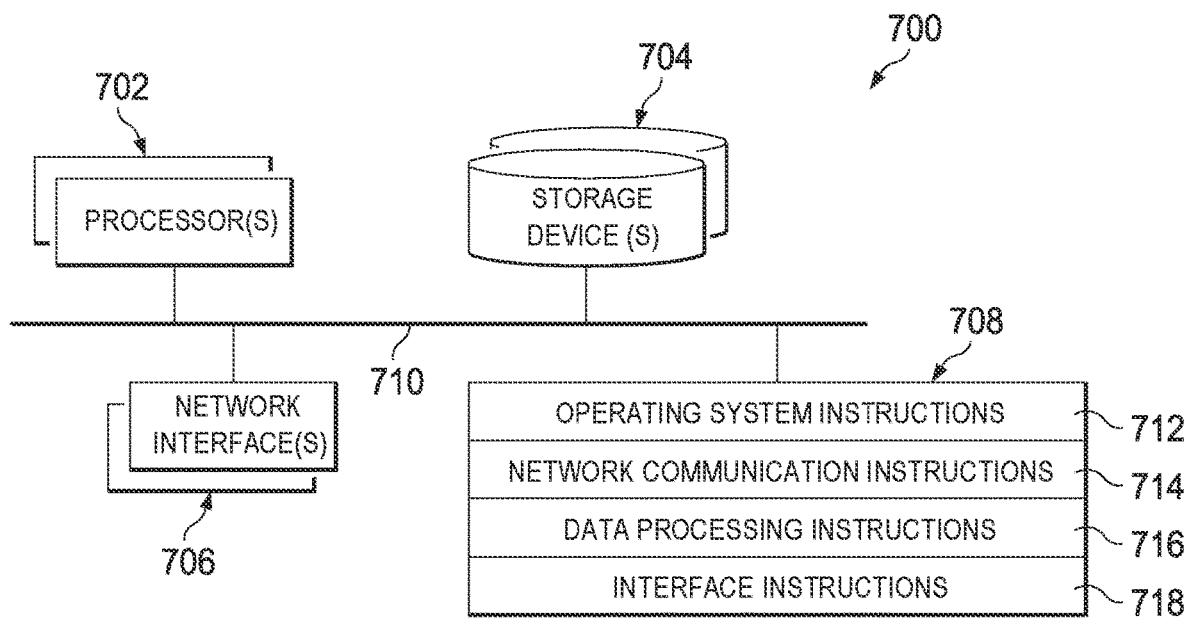
FIG. 7 is an architecture for the cloud computing platform, according to an embodiment.

FIG. 7 is an example architecture 700 for cloud computing platform 102 described in reference to FIGS. 1-6, according to an embodiment. Other architectures are possible, including architectures with more or fewer components. In some implementations, architecture 700 includes one or more processor(s) 702 (e.g., dual-core Intel® Xeon® Processors), one or more network interface(s) 706, one or more storage device(s) 704 (e.g., hard disk, optical disk, flash memory) and one or more computer-readable medium(s) 708 (e.g., hard disk, optical disk, flash memory, etc.). These components can exchange communications and data over one or more communication channel(s) 710 (e.g., buses), which can utilize various hardware and software for facilitating the transfer of data and control signals between components.

The term "computer-readable medium" refers to any medium that participates in providing instructions to processor(s) 702 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium(s) 708 can further include operating system 712 (e.g., Mac OS® server, Windows® NT server, Linux Server), network communication module 714, interface instructions 716 and data processing instructions 718.

Operating system 712 can be multi-user, multiprocessing, multitasking, multithreading, real time, etc. Operating system 712 performs basic tasks, including but not limited to: recognizing input from and providing output to devices 702, 704, 706 and 708; keeping track and managing files and directories on computer-readable medium(s) 708 (e.g., memory or a storage device); controlling peripheral devices; and managing traffic on the one or more communication channel(s) 710. Network communications module 714 includes various components for establishing and maintaining network connections (e.g., software for implementing communication protocols, such as TCP/IP, HTTP, etc.) and for creating a distributed streaming platform using, for example, Apache Kafka™. Data processing instructions 716 include server-side or backend software for implementing the server-side operations, as described in reference to FIGS. 1-6. Interface instructions 718 includes software for implementing a web server and/or portal for sending and receiving data to and from wearable multimedia devices 101, third party application developers 104 and third party platforms 105, as described in reference to FIG. 1.

Architecture 700 can be included in any computer device, including one or more server computers in a local or distributed network each having one or more processing cores. Architecture 700 can be implemented in a parallel processing or peer-to-peer infrastructure or on a single device with one or more processors. Software can include multiple software components or can be a single body of code.

Example Wearable Multimedia Device Architecture

Figure 8:
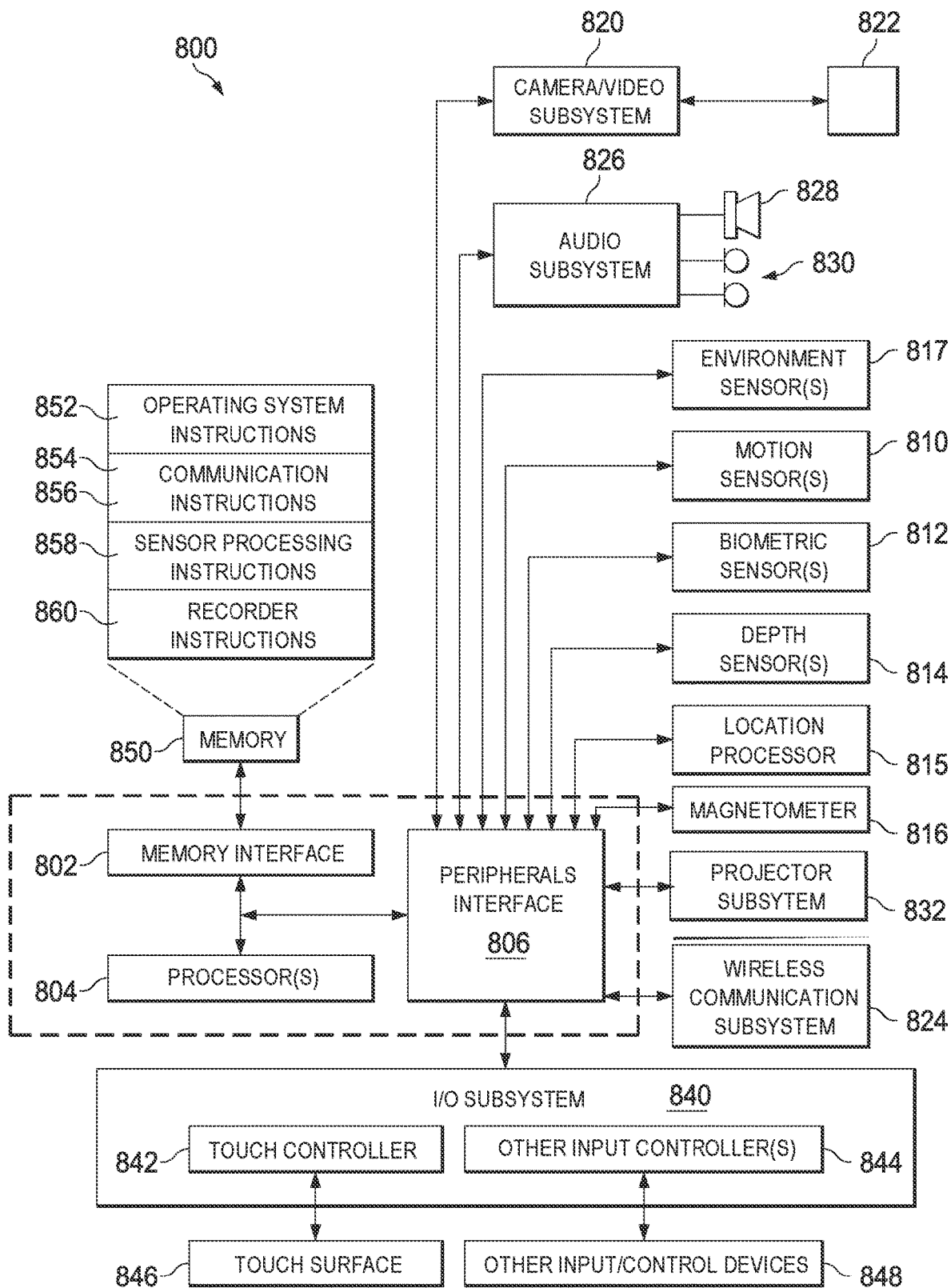
FIG. 8 is an architecture for the wearable multimedia device, according to an embodiment.

FIG. 8 is a block diagram of example architecture 800 for a wearable multimedia device implementing the features and processes described in reference to FIGS. 1-6. Architecture 800 may include memory interface 802, data processor(s), image processor(s) or central processing unit(s) 804, and peripherals interface 806. Memory interface 802, processor(s) 804 or peripherals interface 806 may be separate components or may be integrated in one or more integrated circuits. One or more communication buses or signal lines may couple the various components.

Sensors, devices, and subsystems may be coupled to peripherals interface 806 to facilitate multiple functions. For example, motion sensor(s) 810, biometric sensor(s) 812, and depth sensor(s) 814 may be coupled to peripherals interface 806 to facilitate motion, orientation, biometric, and depth detection functions. In some implementations, motion sensor(s) 810 (e.g., an accelerometer, rate gyroscope) may be utilized to detect movement and orientation of the wearable multimedia device.

Other sensors may also be connected to peripherals interface 806, such as environmental sensor(s) (e.g., temperature sensor, barometer, ambient light) to facilitate environment sensing functions. For example, a biometric sensor can detect fingerprints, face recognition, heart rate and other fitness parameters. In an embodiment, a haptic motor (not shown) can be coupled to the peripheral interface, which can provide vibration patterns as haptic feedback to the user.

Location processor 815 (e.g., GNSS receiver chip) may be connected to peripherals interface 806 to provide geo-referencing. Electronic magnetometer 816 (e.g., an integrated circuit chip) may also be connected to peripherals interface 806 to provide data that may be used to determine the direction of magnetic North. Thus, electronic magnetometer 816 may be used by an electronic compass application.

Camera subsystem 820 and an optical sensor 822, e.g., a charged coupled device (CCD) or a complementary metal-oxide semiconductor (CMOS) optical sensor, may be utilized to facilitate camera functions, such as recording photographs and video clips. In an embodiment, the camera has a 180° FOV and OIS. The depth sensor can include an infrared emitter that projects dots in a known pattern onto an object/subject. The dots are then photographed by a dedicated infrared camera and analyzed to determine depth data. In an embodiment, a time-of-flight (TOF) camera can be used resolve distance based on the known speed of light and measuring the time-of-flight of a light signal between the camera and an object/subject for each point of the image.

Communication functions may be facilitated through one or more communication subsystems 824. Communication subsystem(s) 824 may include one or more wireless communication subsystems. Wireless communication subsystems 824 may include radio frequency receivers and transmitters and/or optical (e.g., infrared) receivers and transmitters. Wired communication systems may include a port device, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data (e.g., a projector).

The specific design and implementation of the communication subsystem 824 may depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, IEEE802.xx communication networks (e.g., Wi-Fi, WiMax, ZigBee™), 3G, 4G, 4G LTE, code division multiple access (CDMA) networks, near field communication (NFC), Wi-Fi Direct and a Bluetooth™ network. Wireless communication subsystems 824 may include hosting protocols such that the device may be configured as a base station for other wireless devices. As another example, the communication subsystems may allow the device to synchronize with a host device using one or more protocols or communication technologies, such as, for example, TCP/IP protocol, HTTP protocol, UDP protocol, ICMP protocol, POP protocol, FTP protocol, IMAP protocol, DCOM protocol, DDE protocol, SOAP protocol, HTTP Live Streaming, MPEG Dash and any other known communication protocol or technology.

Audio subsystem 826 may be coupled to a speaker 828 and one or more microphones 830 to facilitate voice-enabled functions, such as voice recognition, voice replication, digital recording, telephony functions and beamforming.

I/O subsystem 840 may include touch controller 842 and/or another input controller(s) 844. Touch controller 842 may be coupled to a touch surface 846. Touch surface 846 and touch controller 842 may, for example, detect contact and movement or break thereof using any of a number of touch sensitivity technologies, including but not limited to, capacitive, resistive, infrared, and surface acoustic wave technologies, as well as other proximity sensor arrays or other elements for determining one or more points of contact with touch surface 846. In one implementation, touch surface 846 may display virtual or soft buttons, which may be used as an input/output device by the user.

Other input controller(s) 844 may be coupled to other input/control devices 848, such as one or more buttons, rocker switches, thumb-wheel, infrared port, USB port, and/or a pointer device such as a stylus. The one or more buttons (not shown) may include an up/down button for volume control of speaker 828 and/or microphone 830.

Further, a projector subsystem 832 may be connected to peripherals interface 806 to present information visually to a user in the form of projected light. For example, the projector subsystem 832 can project light onto a surface according to a particular spatial and/or temporal pattern, such that the user perceives text, images, videos, colors, patterns, and/or any other graphical information on the surface. In some implementations, the projector subsystem 832 can project light onto a surface of the user's body, such as the user's hand or palm. In some implementations, the projector subsystem 832 can project light onto a surface other than the user's body, such as a wall, a table, a desk, or any other object. The projector subsystem 832 is described in greater detail with reference to FIG. 9.

In some implementations, the projector subsystem 832 project light onto a surface to provide an interactive VI for a user. For example, the projector subsystem 832 can project light onto the surface, such that the user perceives one or more interactive user interface elements (e.g., selectable buttons, dials, switches, boxes, images, videos, text, icons, etc.). Further, the user can interact with the VI by performing one or more gestures with respect to the VI and the user interface elements. For example, the user can perform a pointing gesture, a tapping gesture, a swiping gesture, a waving gesture, or any other gesture using her hands and/or fingers. The wearable multimedia device can detect the performed gestures using one or more sensors (e.g., the camera/video subsystems 820, environment sensor(s) 817, depth sensor(s) 814, etc.), identify one or more commands associated with those gestures, and execute the identified commands (e.g., using the processor(s) 804). Example VIs are described in further detail below.

In some implementations, device 800 plays back to a user recorded audio and/or video files (including spatial audio), such as MP3, AAC, spatial audio and MPEG video files. In some implementations, device 800 may include the functionality of an MP3 player and may include a pin connector or other port for tethering to other devices. Other input/output and control devices may be used. In an embodiment, device 800 may include an audio processing unit for streaming audio to an accessory device over a direct or indirect communication link.

Memory interface 802 may be coupled to memory 850. Memory 850 may include high-speed random access memory or non-volatile memory, such as one or more magnetic disk storage devices, one or more optical storage devices, or flash memory (e.g., NAND, NOR). Memory 850 may store operating system 852, such as Darwin, RTXC, LINUX, UNIX, OS X, iOS, WINDOWS, or an embedded operating system such as VxWorks. Operating system 852 may include instructions for handling basic system services and for performing hardware dependent tasks. In some implementations, operating system 852 may include a kernel (e.g., UNIX kernel).

Memory 850 may also store communication instructions 854 to facilitate communicating with one or more additional devices, one or more computers or servers, including peer-to-peer communications with wireless accessory devices, as described in reference to FIGS. 1-6. Communication instructions 854 may also be used to select an operational mode or communication medium for use by the device, based on a geographic location of the device.

Memory 850 may include sensor processing instructions 858 to facilitate sensor-related processing and functions and recorder instructions 860 to facilitate recording functions, as described in reference to FIGS. 1-6. Other instructions can include GNSS/Navigation instructions to facilitate GNSS and navigation-related processes, camera instructions to facilitate camera-related processes and user interface instructions to facilitate user interface processing, including a touch model for interpreting touch inputs.

Each of the above identified instructions and applications may correspond to a set of instructions for performing one or more functions described above. These instructions need not be implemented as separate software programs, procedures, or modules. Memory 850 may include additional instructions or fewer instructions. Furthermore, various functions of the device may be implemented in hardware and/or in software, including in one or more signal processing and/or application specific integrated circuits (ASICs).

Figure 9:
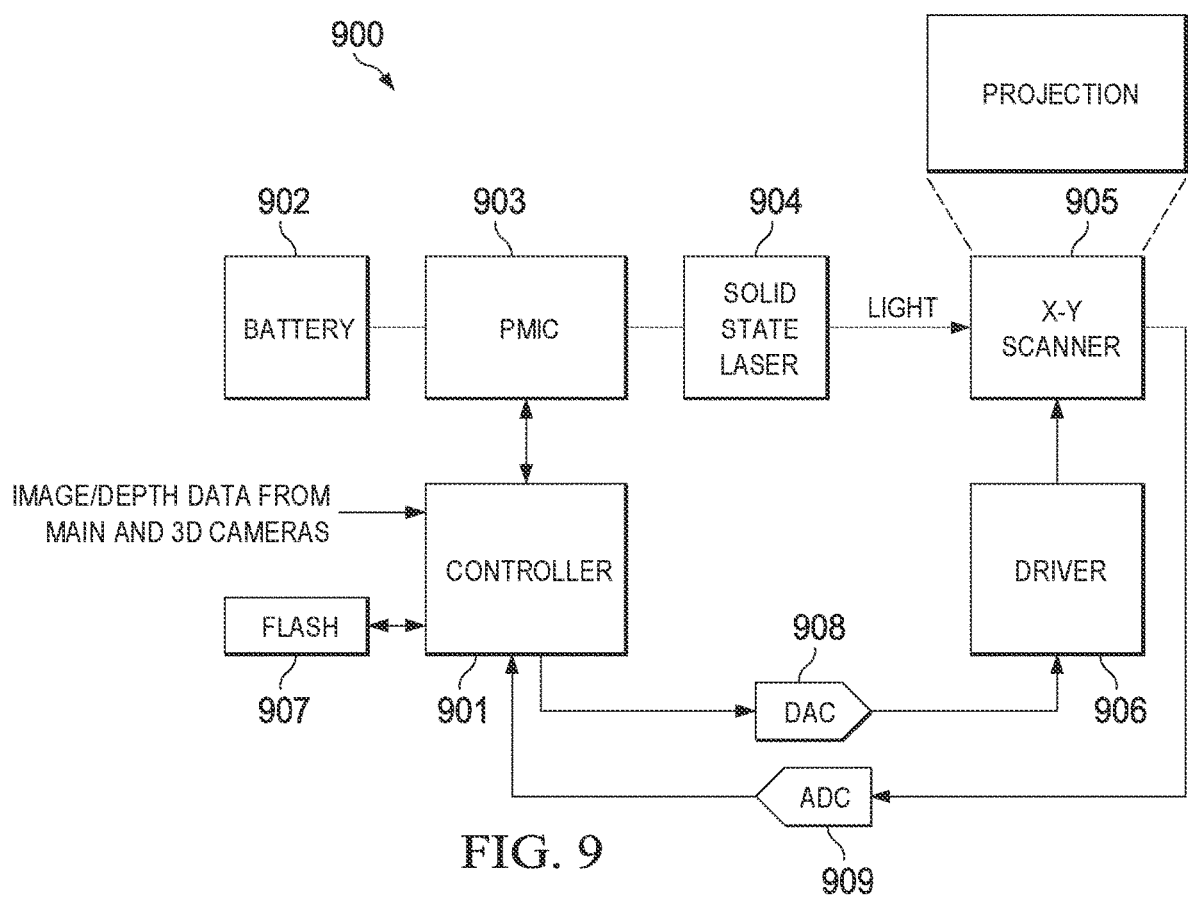
FIG. 9 is a system block diagram of a projector architecture, according to an embodiment.

FIG. 9 is a system block diagram of the projector subsystem 832, according to an embodiment. The projector subsystem 832 scans a pixel in two dimensions, images a 2D array of pixels, or mixes imaging and scanning. Scanning projectors directly utilize the narrow divergence of laser beams, and two-dimensional (2D) scanning to "paint" an image pixel by pixel. In some embodiments, separate scanners are used for the horizontal and vertical scanning directions. In other embodiments, a single biaxial scanner is used. The specific beam trajectory also varies depending on the type of scanner used.

In the example shown, the projector subsystem 832 is a scanning pico-projector that includes controller 901, battery 902, power management chip (PMIC) 903, solid state laser 904, X-Y scanner 905, driver 906, memory 907, digital-to-analog converter (DAC) 908 and analog-to-digital converter (ADC) 909.

Controller 901 provides control signals to X-Y scanner 905. X-Y scanner 905 uses moveable mirrors to steer the laser beam generated by solid state laser 904 in two dimensions in response to the control signals. X-Y scanner 95 includes one or more micro-electromechanical (MEMS) micromirrors that have controllable tilt angles in one or two dimensions. Driver 906 includes a power amplifier and other electronic circuitry (e.g., filters, switches) to provide the control signals (e.g., voltages or currents) to X-Y scanner 905. Memory 907 stores various data used by the projector including laser patterns for text and images to be projected. DAC 908 and ADC 909 provide data conversion between digital and analog domains. PMIC 903 manages the power and duty cycle of solid state laser 1904, including turning on and shutting of solid state laser 904 and adjusting the amount of power supplied to solid state laser 904. Solid state laser 904 can be, for example, a vertical-cavity surface-emitting laser (VCSEL).

In an embodiment, controller 901 uses image data from the camera/video subsystem 820 and/or depth data from the depth sensor(s) 814 to recognize and track user hand and/or finger positions on the laser projection, such that user input is received by the wearable multimedia device 101 using the laser projection as an input interface.

In another embodiment, the projector subsystem 832 uses a vector-graphic projection display and low-powered fixed MEMS micromirrors to conserve power. Because the projector subsystem 832 includes a depth sensor, the projected area can be masked when necessary to prevent projecting on a finger/hand interacting with the laser projected image. In an embodiment, the depth sensor can also track gestures to control the input on another devices (e.g., swiping through images on a TV screen, interacting with computers, smart speakers, etc.).

In other embodiments, Liquid Crystal on Silicon (LCoS or LCOS), Digital Light Processing (DLP) or Liquid Chrystal Display (LCD) digital projection technology can be used instead of a pico-projector.

Example Virtual Interfaces

As described above, a wearable multimedia device 101 can include a projector subsystem 832 configured to present information visually to a user in the form of projected light. For example, the projector subsystem 832 can project light onto a surface (e.g., a surface of a user's hand, such as the user's palm) according to a particular spatial and/or temporal pattern, such that the user perceives a VI with one or more user interface elements. In some implementations, a VI and/or the user interface elements can include any combination of text, images, videos, colors, patterns, shapes, lines, or any other graphical information.

Further, the user can perform gestures to interact with the VI. For instance, the user can perform one or more gestures directed at one or more of the user interface elements. As examples, the user can point to a user interface element, touch or tap a user interface element using her finger (e.g., a single time, or multiple times in a sequence), perform a swiping motion along a user interface element using her finger, wave at a user interface element using her hand, hover over the user interface element, or perform any other hand or finger gesture. The wearable multimedia device 101 can detect the performed gestures using one or more sensors (e.g., the camera/video subsystems 820, environment sensor(s) 817, depth sensor(s) 814, etc.), identify one or more commands associated with those gestures, and execute the identified commands (e.g., using the processor(s) 804).

At least some of the user interface elements and/or commands can be used to control the operation of the wearable multimedia device 101. For example, at least some of the user interface elements and/or commands can be used to execute or control the generation of video and/or audio content, the viewing of content, the editing of content, the storing and transmission data, and/or any other operation described herein. In some implementations, a wearable multimedia device 101 can present a VI that allows a user to view images, or interact with displayed images, e.g., by marking them as a favorite or sharing them with one or more other users. This VI may also be referred to as a camera interface. An example of a camera interface is shown in FIG. 10B, which illustrates a camera interface 1028 projected by a projector subsystem 832 onto a user's palm 1026. The camera interface 1028 displays a representation of a cropped image 1018, which is generated as described in detail below with respect to FIGS. 10A-10B, 11, and 12.

Figure 10A:
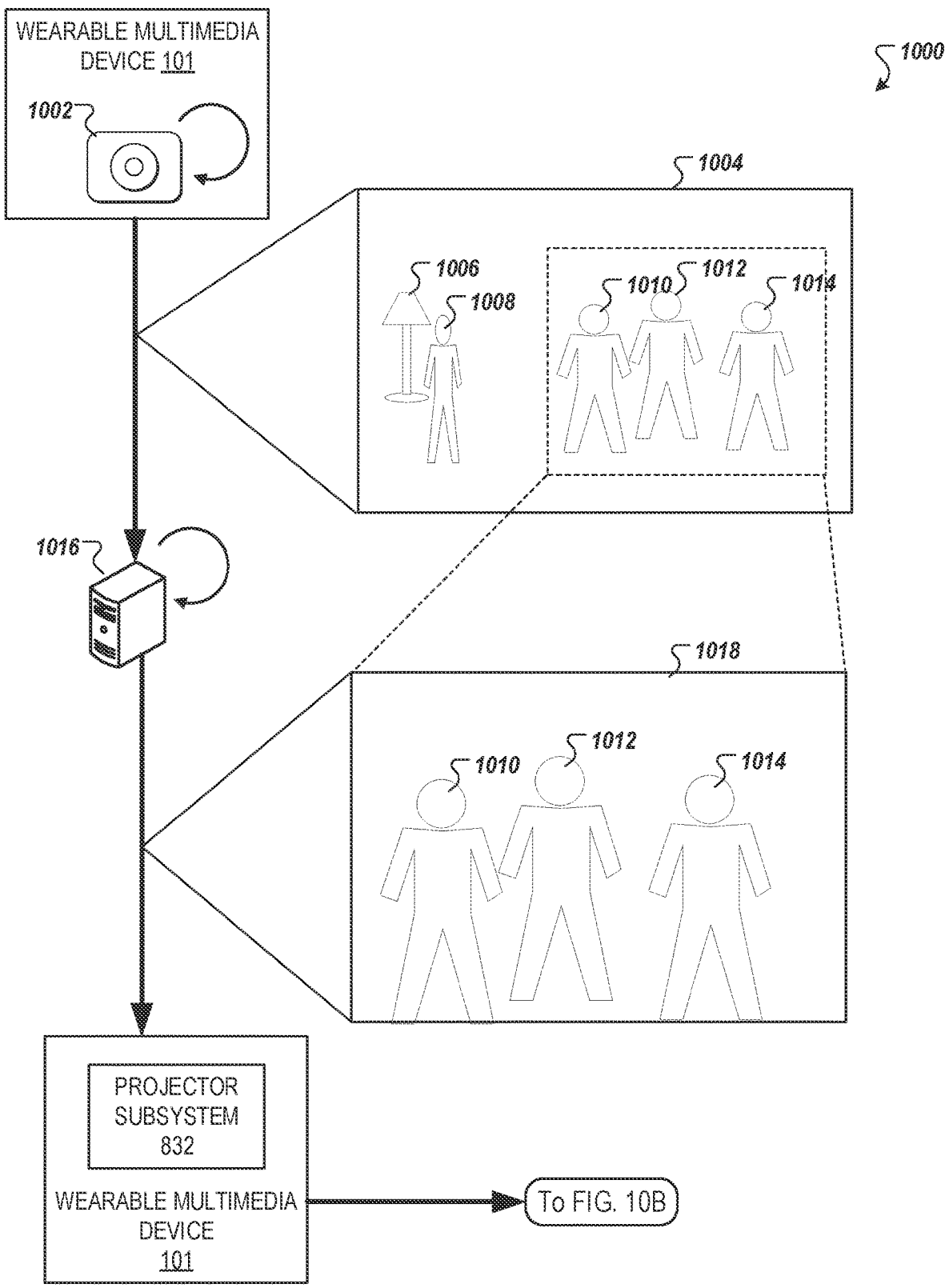
FIG. 10A is a diagram of a system for directed cropping of images.
Figure 10B:
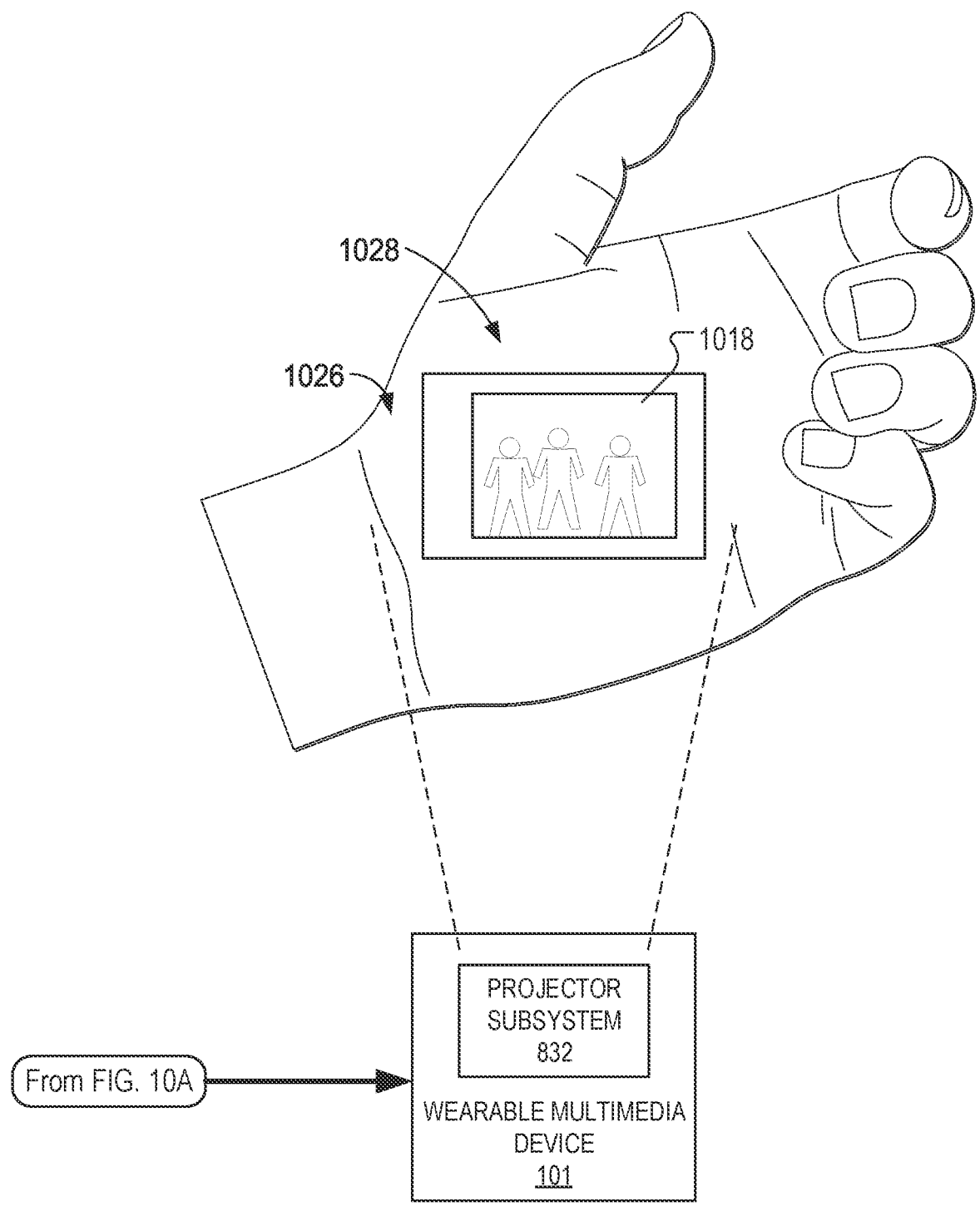
FIG. 10B is a diagram is a diagram of an example virtual interface, according to an embodiment.

FIG. 10A shows an example of a system 1000 for directed cropping of images. The system 1000 includes device wearable multimedia device 101 with an image capture device 1002 component, and a network device 1016. In some implementations, the image capture device 1002 corresponds to the camera subsystem 820.

In some implementations, the network device 1016 is a network server that is communicably coupled to the wearable device 101. For example, in some implementations, the network device 1016 is on a network server in the cloud computing platform 102. In some implementations, the network device 1016 includes one or more processors that perform directed cropping, as described below. In some cases, the one or more processors are similar to the processor(s) 702.

Although the following description is with respect to a network device 1016 that is different from wearable multimedia device 101, in some implementations, the wearable multimedia device 101 includes one or more processors to perform the directed cropping operations detailed below, as indicated previously. In some implementations, the wearable multimedia device 101 and the network device 1016 work in conjunction to perform the directed cropping operations.

In some implementations, the image capture device 1002 is used to capture one or more images of a scene, and the image data is provided to the network device 1016. For example, the wearable multimedia device 101 can provide image data, such as the image 1004 captured using image capture device 1002, to the network device 1016. The network device 1016 processes the image 1004 using its one or more processors.

In some implementations, the image 1004 is a wide view image representing a wide view of a scene. For example, as shown, the image 1004 includes an object 1006, and persons 1008, 1010, 1012, and 1014. The person 1008 is not looking at the image capture device 1002 at the time the image 1004 is captured. The persons 1010, 1012, and 1014 are looking at the image capture device 1002 at the time the image 1004 is captured.

In some implementations, the network device 1016 includes one or more trained models. For example, the models can be trained using a selection of one or more images. The one or more images can be selected by a user or by an automated process, such as one or more algorithms or trained models.

In some implementations, the network device 1016 executes the one or more trained models using one or more constituent processors to extract one or more features from the image 1004. For example, the trained models can extract a feature in the focus frame of the image, which includes one or more of the persons 1010, 1012, and 1014 looking at the image capture device 1002. The trained models can extract another feature outside the focus frame, which includes the person 1008 not looking at the image capture device 1002. The models trained by the network device 1016 can also extract a feature indicating extraneous objects in the image, such as background objects, e.g., the object 1006.

In some implementations, the network device 1016 provides network device 1016 data corresponding to the image 1004 to a model that is trained to increase the resolution of the image 1004. The model can generate one or more additional pixels based on the pixels of the image 1004. In some implementations, the model interpolates pixel values between two pixel values based on a portion of pixels including the two pixel values.

The network device 1016 generates a cropped image 1018. The cropped image 1018 includes persons 1010, 1012, and 1014. The cropped image 1018 is a cropped version of the image 1004. In some implementations, the portion of the image 1004 used for the cropped image 1018 is determined using one or more trained models. In some implementations, the portion of the image 1004 used for the cropped image 1018 is determined using one or more algorithms. In some implementations, the network device 1016 determines an area of the image 1004 that is in focus, includes objects of interest, does not include out of focus subject or objects, or does not include extraneous objects. For example, as discussed in FIG. 10B, the network device 1016 can generate one or more features from one or more reference images. The features can indicate one or more subjects or objects to be kept in focus, subjects or objects of interest, subjects or objects not of interest, such as extraneous objects, among others.

The network device 1016 provides the cropped image 1018 to the wearable device 101. As shown in FIG. 10B, the wearable device 101 is configured to display the cropped image 1018. As an illustrative example, FIG. 10B shows a camera interface 1028 projected by a projector subsystem 832 onto a user's palm 1026. The user can interact with the camera interface 1028 to view digital content, select digital content, or control a digital image capture device of the wearable multimedia device 101. In the example of FIG. 10B, the camera interface 1028 includes a representation of the cropped image 1018 generated by the network device 1016.

In some implementations, the network device 1016 provides data to one or more other devices. For example, the network device 1016 can provide the cropped image 1018 to a storage database on the network. The network device 1016 can provide the cropped image 1018 to one or more user devices such as a smartphone, television, monitor, among others, in addition to, or instead of, the wearable multimedia device 101.

In some implementations, the camera interface 1028 is configured to receive user input. For example, a user of the wearable multimedia device 101 can interact with the camera interface 1028 with a finger or a pointing device, or other suitable means. In doing so, the user can interact with the cropped image 1018 shown using the camera interface 1028. For example, the user can provide input selecting the cropped image 1018 as a favorite image. Alternatively, the user can provide input indicating that the cropped image 1018 is not correct or includes low quality features, such as blurriness, incorrect cropping, among others.

In some implementations, the user input is to adjust one or more trained models that generate the cropped image 1018. For example, the wearable device 101 can provide data indicating the user input, such as input from the user indicating the cropped image 1018 is good, bad, a favorite, is shared with one or more other users, or is deleted, among others, to the network device 1016. The network device 1016 can use the input as a training data point. For example, the network device 1016 can adjust one or more weights of one or more models such that the data corresponding to the image 1004 used to generate cropped image 1018 generates a different cropped image.

In some implementations, the wearable device 101 obtains input from the user and uses the input to adjust one or more algorithms that generate the cropped image 1018. For example, the network device 1016 can determine one or more features of the cropped image 1018 are less likely to result in an acceptable image. In some implementations, the network device 1016 adjusts one or more weights in a summation. For example, a weight corresponding to a feature of the cropped image 1018 can be adjusted based on user feedback on the cropped image 1018 indicating one or more features are less or more likely to result in an acceptable image.

In some implementations, the network device 1016 adjusts, e.g., either up or down depending on implementation, a weight corresponding to a feature to make the feature less likely to appear in a cropped image based on receiving a negative input from a user, such as a delete, dislike, or other input. In some implementations, the network device 1016 adjusts, e.g., either up or down depending on implementation, a weight corresponding to a feature to make the feature more likely to appear in a cropped image based on receiving a positive input from a user, such as a share to another user, a like, a favorite, a period of viewing time, or other input.

Figure 11:
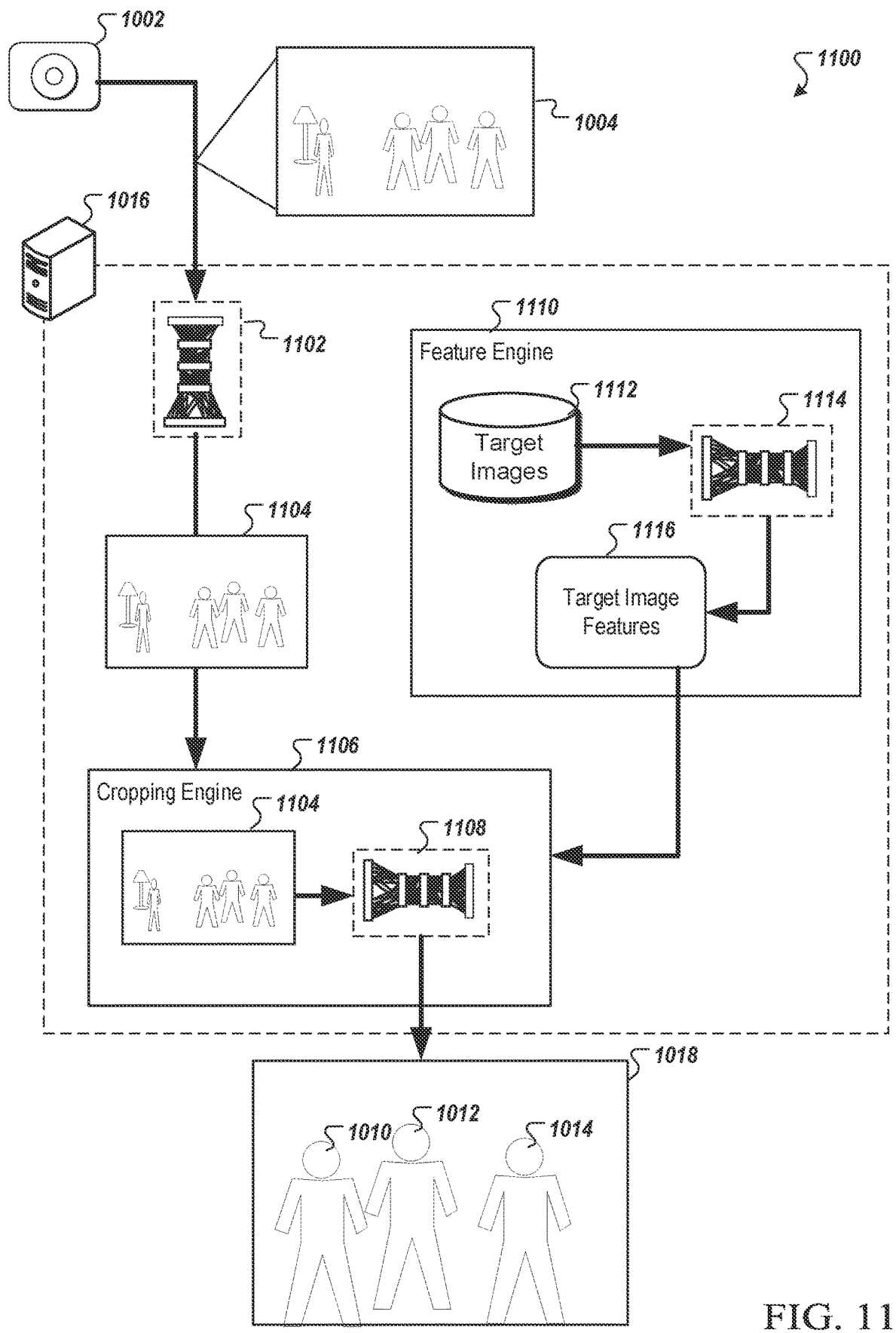
FIG. 11 is a diagram of a system for generating a cropped image.

FIG. 11 shows an example of a system 1100 for generating a cropped image. The system 1100 shows a particular implementation of the system 1000. The system 1100 includes the image capture device 1002 and the network device 1016. In the example of FIG. 11, the network device 1016 includes a cropping engine 1106 and a feature engine 1110.

As described in reference to FIG. 10A, the image capture device 1002 provides the image 1004 to the network device 1016. In some implementations, the network device 1016 provides data representing the image 1004 to a trained model 1102. For example, the trained model 1102 can be trained to generate an upscaled version 1104 of the image 1004. The model 1102 can be trained using one or more training images. Training images can include images of low resolution with a corresponding higher resolution image used as ground truth data. The model 1102 can be trained to generate a prediction of a higher resolution image based on a low resolution image. The network device 1016, or another processor, can train the model 1102 by comparing a predicted higher resolution image from the output of the model 1102 with a corresponding known high resolution image used to derive the low resolution image. The network device 1016 can adjust one or more weights or parameters of the model 1102 such that the model 1102 generates predicted higher resolution images that more closely match known high resolution images overtime.

The cropping engine 1106 obtains data corresponding to the image 1004. In some implementations, the cropping engine 1106 obtains an upscaled version 1104 of the image 1004. For example, after providing data corresponding to the image 1004 to the model 1102, the network device 1016 can obtain output of the model 1102. The output of the model 1102 can include an upscaled version 1104 of the image 1004. The upscaled version may be useful in order to allow cropping into small regions without suffering from poor resolution. Without upscaling, cropping into a small region may result in pixelated images that are generally disfavored by users.

In some implementations, the cropping engine 1106 provides data corresponding to the image 1004 to a trained model 1108. For example, the cropping engine 1106 can provide the upscaled image 1104 to the trained model 1108. In some implementations, the trained model 1108 uses one or more other data items to determine what portion of the image 1104 to crop. For example, the cropping engine 1106 can obtain data corresponding to target image features 1116 generated by the feature engine 1110. The trained model 1108 can identify a portion of the image 1104 that includes one or more of the target image features 1116. The trained model 1108 can crop the image 1104 to include the one or more features in the identified portion.

The cropping engine 1106 obtains data corresponding to target image features 1116 from the feature engine 1110. In some implementations, the feature engine 1110 includes target images 1112. In some implementations, the feature engine 1110 includes a trained model 1114. For example, the feature engine 1110 can train the model 1114 based on the target images 1112 to determine abstracted features from the target images 1112. The abstracted features can include one or more data values, such as vectors or the like, that indicate a visual feature. In some implementations, features include a person's attention in an image. In some implementations, features include focus or resolution of persons or objects in an image. In some implementations, features include arrangement of persons or objects. In some implementations, features include objects of interest, such as paintings, chandeliers, birthday cake, athletes on the field, track, or in motion, among others.

In some implementations, the target images 1112 includes one or more images selected by a user. For example, a user can view a gallery of one or more images and select one or more images. In some implementations, a user views one or more images using the camera interface 1028. In general, the user can select images that they like. A user may have a preference for a specific style of image, such as an image that features persons, or particular one or more persons, prominently, arranges subjects in a specific way within a frame, has certain lighting or effects added, among others. The feature engine 1110 can obtain the favorited, or liked, or selected, images and can add them to the target images 1112.

In some implementations, the model 1114 is trained to generate target image features 1116. For example, the feature engine 1110 can provide a portion of the target images 1112 to the model 1114. The model 1114 can output one or more data values indicating one or more features. In some implementations, the feature engine 1110 uses another portion of the target images 1112 to test the features predicted by the model 1114. For example, the feature engine 1110 can provide the other portion of the target images 1112 to the model 1114. The model 1114 can predict one or more features from the other portion of the target images 1112. The feature engine 1110 can compare the features predicted for the other portion with the features predicted for the first portion of the target images 1112. Based on a comparison, the feature engine 1110 can determine to add additional features to the target image features 1116.

In some implementations, the feature engine 1110 updates the target image features 1116 to include one or more features identified in one or more of the target images 1112. In general, features can include one or more characteristics such as particular persons, colors, arrangement of objects, lighting, or other features represented in an image.

In some implementations, the network device 1016 compares data corresponding to the image 1004 to data of one or more target images, such as the target images 1112. For example, the network device 1016 can compare the image 1004 or the upscaled image 1104 to one or more target images. One or more target images can include previously obtained images. Previously obtained images can include images from one or more user libraries. The previously obtained images can be stored on the network device 1016 or in a storage device communicably connected to the network device 1016. In some implementations, the previously obtained images are stored on the wearable device 101.

In some implementations, the one or more target images include at least one similar image. For example, the image 1004 and the similar image can be of the same category. Categories can include party images, human faces, human full bodies, human portrait, nature landscape, nature object, animal images, among others. Images within a category can include one or more features in common with one another. For example, in at least one implementation, images in a category of party images can include people in close proximity to one another. In at least one implementation, images in a category of human faces can include a human face, identified by one or more features of a face, such as a nose, eyes, mouth, among others.

In general, the network device 1016 can determine one or more categories of a particular type based on a common set of one or more features between two or more images. New images can be added to existing categories or can be used to generate new categories. In some implementations, a new image is combined with one or more other images to form a new category based on the one or more images sharing a greater number of features, or matching more strongly based on one or more values indicating one or more features, with the new image than other images of a previous category. In some implementations, clustering algorithms or the like are used to determine categories of images. In some implementations, the network device 1016 obtains stock images from predetermined categories with predetermined features, which may be especially useful in an initial implementation before sufficient user images are obtained.

In some implementations, one or more values represent a feature of an image. The wearable device 101 or the network device 1016 can identify and generate feature values based on portions of an image, such as the image 1004. Algorithms or trained models of the wearable device 101 or the network device 1016 can parse pixel values of an image, such as the image 1004, and identify patterns. Patterns can indicate certain types of objects, arrangement of objects, or appearance of objects. In some implementations, feature identification includes object detection.

In some implementations, feature identification includes abstracting various elements of an image into categories of objects or visual qualities. For example, the network device 1016 can identify a facial feature of an image based on detecting a human face in the image. Based on one or more identified features, including the facial feature, the network device 1016 can identify a category of the image. If the network device 1016 identifies additional facial features indicating a group of two or more persons, the network device 1016 can identify a category of the image as a party scene. If the network device 1016 does not identify any other facial features and the face is arranged to fill a threshold portion of the image, the network device 1016 can identify a category of the image as a portrait image.

In some implementations, the network device 1016 compares data corresponding to the image 1004 to data of the one or more target images to determine which images of the one or more target images best matches the image 1004. For example, the network device 1016 can obtain one or more images of the same category as the image 1004. The one or more images of the same category can include one or more target images. The network device 1016 can generate a score for each comparison of the data corresponding to the image 1004 and an image of the one or more images of the same category. The network device 1016 can determine a score, such as the highest or lowest, depending on the implementation, indicating the best match. The network device 1016 can identify the image of the one or more images of the same category corresponding to the score indicating the best match as the best matching image. In some implementations, the network device 1016 generates a distance measure indicating a difference between one or more features of a target image and one or more features of the image 1004. For example, a score indicating the best match can include one or more values indicating one or more features of a target image and one or more features of the image 1004 are the same.

In some implementations, the cropping engine 1106 generates the cropped image 1018 based on a best matching image. For example, the network device 1016 can determine the best matching image based on comparing data corresponding to the image 1004 to data of one or more of the target images 1112, as discussed herein. The network device 1016 can determine a cropping used in the best matching image and apply the cropping to the image 1004.

In some implementations, the feature engine 1110 determines features indicating a cropping of a best matching image. For example, the feature engine 1110 can determine features of a cropping, such as the space between a human face and one or more edges of an image. Features of a cropping can include features identified in the target images 1112, such as the type, quality, or arrangement of subjects or objects in an image.

In some implementations, the feature engine 1110 determines a number of features for each image in the target images 1112. For example, the feature engine 1110 can determine a first number of features for a first image of the target images 1112 and a second number of features for a second image of the target images 1112. In some implementations, based on comparing the first number of features with the second number of features, the feature engine 1110 can determine what features to include in the target image features 1116. For example, the feature engine 1110 can identify features that are common to both the first number of features and the second number of features and include those features in the target image features 1116.

In some implementations, the feature engine 1110 generates a weight for one or more features identified from the target images 1112. For example, the feature engine 1110 can identify a first feature in a first image of the target images 1112. The feature engine 1110 can generate a weight associated with the first feature indicating the likelihood that the feature is an indication of a portion of an image that would, when cropped, result in a high quality image preferred by a user.

In some implementations, the feature engine 1110 can generate a weight for one or more features based on the number of similar features identified. For example, the feature engine 1110 can determine that a first identified feature is similar to a second identified feature from one or more images of the target images 1112. The feature engine 1110 can generate a weight for a feature of the target image features 1116, corresponding to each of the first identified feature and the second identified feature, indicating that the feature is more likely, compared to a feature that is only identified once from one or more images of the target images 1112, an indicator of a portion of an image that would, when cropped, result in a high quality image preferred by a user.

In some implementations, the feature engine 1110 increases a weight of a feature of the target image features more if the feature is identified in at least 2 images of the target images 1112. For example, the feature engine 1110 can generate a smaller weight for a feature identified twice in the same image compared to a feature that is identified once in two images of the target images 1112. In general, the method of determining features and weights of the target image features 1116 can change based on implementation.

The feature engine 1110 provides the target image features to the cropping engine 1106. In some implementations, the cropping engine 1106 obtains the target image features 1116 and provides the features 1116 to one or more algorithms or a trained model, such as the model 1108. For example, the cropping engine 1106 can provide the target image features 1116 to the trained model 1108. In some implementations, the cropping engine 1106 provides both the image 1104 and the target image features 1116 to the trained model 1108. For example, the cropping engine 1106 can train the model 1108 to detect portions of input images that include one or more features. The one or more features can be input parameters to the model 1108 or can be represented by weights and parameters of the model 1108. For example, the cropping engine 1106 can adjust one or more weights and parameters of the model 1108 based on one or more features of one or more input images or the target images 1112.

In some implementations, the cropping engine 1106 trains the model 1108. For example, the cropping engine 1106 can provide input images to the model 1108. The cropping engine 1106 can obtain output from the model 1108. The output can include a predicted high quality portion of an input image. In some implementations, the cropping engine 1106 obtains ground truth data indicating one or more high-quality portions of images. For example, a user can select a portion of an image as a high quality portion, such as a portion that includes features that the user likes, considers noteworthy, or interesting, among others.

In another example, ground truth data includes data representing one or more features of the target image features 1116. The cropping engine 1106 can determine whether or not a predicted high quality portion in the output of the model 1108 includes one or more features of the target image features 1116. Based on comparing the features of the predicted high quality portion with the features of the target image features 1116, the cropping engine 1106 can adjust one or more weights or parameters of the model 1108.

In some implementations, the cropping engine 1106 determines features from a predicted high quality portion of the image 1104. For example, the cropping engine 1106 can provide an output from an algorithm or trained model, such as the model 1108, indicating a predicted high quality portion of the image 1104 to the feature engine 1110. The feature engine 1110 can determine, based on processing of one or more algorithms or trained models, such as the model 1114, what features are represented in the predicted high quality portion of the image 1104.

In some implementations, the cropping engine 1106 identifies multiple portions of the image 1104 as a potential high quality portion of the image. For example, the cropping engine 1106 can identify a first portion and a second portion of the image 1104. The cropping engine 1106 can determine one or more features represented in the first portion and one or more features represented in the second portion. The cropping engine 1106 can compare the one or more features represented in the first portion to the target image features 1116. The cropping engine 1106 compare the one or more features represented in the second portion to the target image features 1116. Based on comparing the one or more features of the first portion and the second portion, the cropping engine 1106 can determine the first portion of the image 1104 is likely higher quality than the second portion.

In some implementations, the cropping engine 1106 determines a quality of a portion of an image based on features represented in the portion. For example, the cropping engine 1106 can obtain a first portion of the image 1104 and identify, through processing of one or more algorithms or trained models, one or more features of the first portion. The cropping engine 1106 can obtain target image features, such as the target image features 1116, and compare the target image features to the one or more features of the first portion. Based on the comparison, the cropping engine 1106 can determine if the first portion is likely of high-quality or low-quality. In general, high-quality portions can include more features common with the target image features 1116 than low-quality portions indicating that the high-quality portions are more similar to the target images 1112.

The cropping engine 1106 generates the image 1018. In some implementations, the cropping engine 1106 identifies multiple portions of the image 1104 and generates the image 1018 based on a portion of the multiple portions. For example, the cropping engine 1106 can compare features of the multiple portions to determine one or more portions of high-quality. The cropping engine 1106 can identify a single portion or multiple portions that are likely of higher quality than one or more other portions identified. As discussed herein, the cropping engine 1106 can determine quality based on identifying features represented in portions.

In some implementations, the cropping engine 1106 identifies a portion of the image 1104 that is of the highest quality. For example, the cropping engine 1106 can determine a quality for each of the one or more identified portions of the image 1104. The cropping engine 1106 can compare the quality of each of the one or more identified portions. The cropping engine 1106 can select the identified portion corresponding to the highest quality. The cropping engine 1106 can generate the image 1018 based on the identified portion corresponding to the highest quality.

In some implementations, the network device 1016 provides image data to one or more trained models. In some implementations, the network device 1016 provides image data to one or more algorithms. For example, instead, or in addition to, one or more of the models 1102, 1108, 1114, the network device 1016 can generate the image 1018 using one or more algorithms. The one or more algorithms can include one or more algorithms for selecting a portion of the image 1004 or a portion of an image generated based on the image 1004, such as an upscaled version of the image 1004. The one or more algorithms can include one or more algorithms for generating an upscaled version of the image 1004. The one or more algorithms can include one or more algorithms for generating the target image features 1116. The one or more algorithms can include one or more algorithms for generating the image 1018.

In some implementations, the network device 1016 obtains data representing additional images to inform directed cropping. For example, a user can select one or more images. The network device 1016 can obtain data indicating one or more selected images. The network device 1016 can add one or more selected images to the target images 1112. In some implementations, the feature engine 1110 generates new features of the target image features 1116 representing features of the added one or more selected images. In some implementations, the network device 1016, and components thereon, retrain one or more models based on the network device 1016 adding one or more selected images to the target images 1112. For example, the feature engine 1110 can retrain the model 1114 to generate features represented in the target images 1112 including images newly added. In this way, the system 1100 can update the type of cropped images generated to suit current user preferences.

In some implementations, the network device 1016 obtains one or more images from a network server, user device, or automated process. For example, the network device 1016 can obtain images not selected by using to be included in the target images 1112. Images not selected by the user but included in the target images 1112 can include images determined by system administrators or automated processes to be high-quality. These high-quality images can include images that prominently feature human faces, are in focus, include subjects arranged with minimal background in the frame, are aligned, include visually appealing color balancing as well as light balancing, that are taken by professional photographers, among others. In this way, the system administrators, or automated processes, such as one or more algorithms or trained models, can seed the target images 1112 to generate professional looking or high-quality images.

In some implementations, the target image features 1116 include pre-configured features. For example, before or after deployment, system administrators or automated processes can update the target image features 1116 to include one or more generic features of high-quality images, such as subjects in focus, subjects with eyes open, subjects that are looking at a camera taking the image, such as the image capture device 1002, specific subjects, such as pets of a user, friends of a user, family members of the user, significant others, among others.

In some implementations, the network device 1016 obtains one or more data streams to determine objects or subjects of interest. For example, the network device 1016 can parse an image database representing image of a user of the image capture device 1002. The network device 1016 can identify one or more persons in one or more images of the image database. The network device 1016 can include the specific identified persons as features of the target image features 1116. For example, the target image features 1116 can include one or more features of a specific person. The cropping engine 1106 can then identify portions of the image 1104 that include one or more features representing one or more identified persons. In this way, the system 1100 can generate cropped images that include persons or objects of interest.

Additional Example Processes

Figure 12:
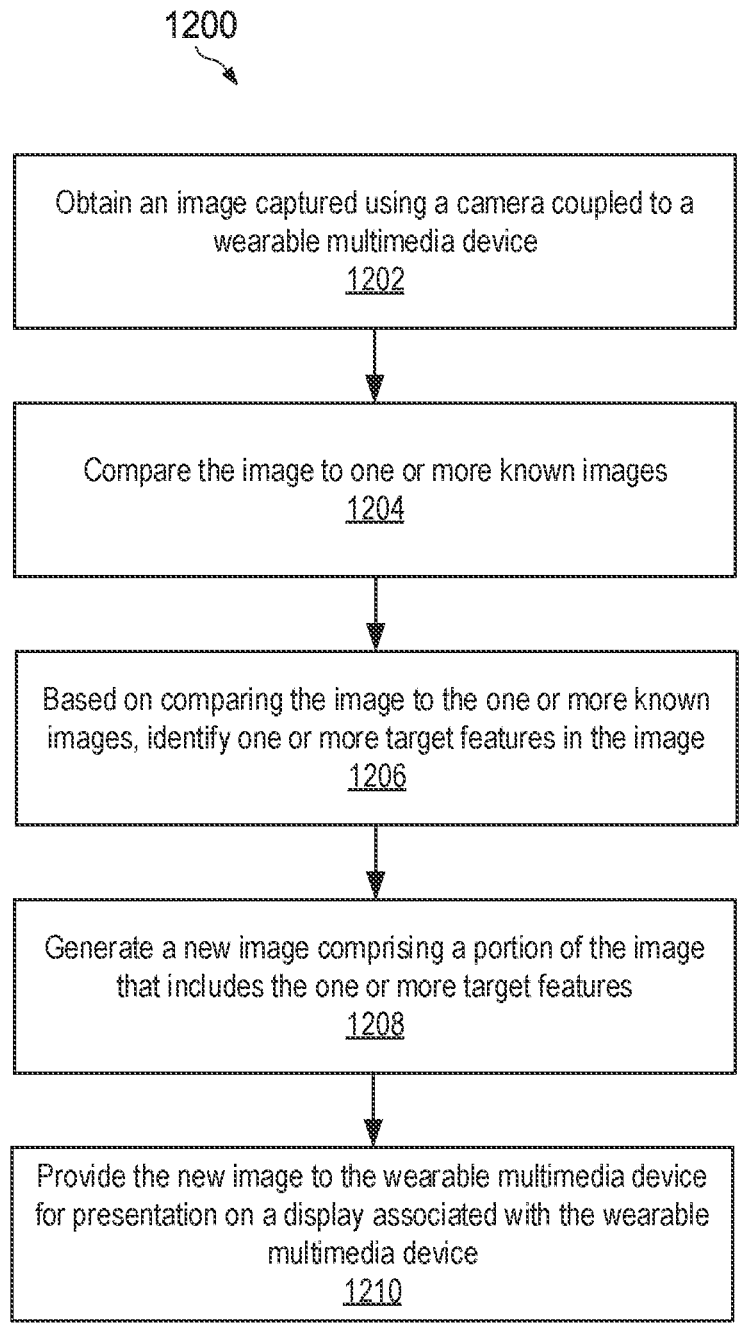
FIG. 12 is flow diagram of a process for generating a cropped image.

FIG. 12 is flow diagram of an example process 1200 for generating a cropped image, according to an embodiment. Process 1200 can be implemented using wearable multimedia devices 101 described in reference to FIGS. 1-9.

The process 1200 includes obtaining an image captured using a camera coupled to a wearable multimedia device (1202). For example, as shown in FIG. 11, the image capture device 1002 provides the image 1004 to the network device 1016. The image capture device 1002 can include a camera. The image capture device 1002 can be coupled to the wearable device 101.

The process 1200 includes comparing the image to one or more known images (1204). For example, the network device 1016, or components, such as the cropping engine 1106 or feature engine 1110, can compare the image to one or more of the target images 1112. The target images 1112 can include images selected by a user. The target images 1112 can include one or more images from a user library or stock images available on a connected database. The target images 1112 can include images that are similar to the captured image 1004, such as images of a same category or images that include one or more similar or identical features.

In some implementations, the network device 1016 compares the image to target images based on extracted features. For example, instead of directly comparing images, the network device 1016 can use the feature engine 1110 to generate features of the target images 1112 as well as the image 1004. The network device 1016 can compare the features of the target images 1112 to the features of the image 1004 to determine an image, corresponding to a set of one or more features, that best matches the image 1004. The network device 1016 can provide the best matching image of the target images 1112, or data corresponding to the best matching image, such as corresponding features, to the cropping engine 1106. The cropping engine 1106 can then apply a cropping, based on the data of the best matching image, to the captured image to generate a cropped image 1018. The image 1018 can include the same or greater number of common features with the best matching image. In general, the cropping of the cropping engine 1106 can change one or more features of the image 1004 to match the features of the matching image.

The process 1200 includes, based on comparing the image to the one or more known images, identifying one or more target features in the image (1206). For example, the cropping engine 1106 can obtain data corresponding to the image 1004, such as an upscaled image 1104, and identify features of the data. In some cases, the cropping engine 1106 provides the data to the feature engine 1110 to determine features corresponding to the image 1004. The cropping engine 1106 can then determine which features of the image 1004 correspond to target features 1116 identified from the feature engine 1110 processing the target images 1112.

The process 1200 includes generating a new image comprising a portion of the image that includes the one or more target features (1208). For example, the cropping engine 1106 can generate the image 1018 based on the image 1004 and one or more target features identified in the portion of the image 1004 represented by the image 1018. The target features in the image 1018 can include in focus human faces, faces that are facing the camera, such as the image capture device 1002, arrangement of subjects within a center portion of the frame of the image 1018, among others.

The process 1200 includes providing the new image to the wearable multimedia device for presentation on a display associated with the wearable multimedia device (1210). For example, as shown in FIG. 10B, the wearable device 101 can obtain the image 1018 and provide data corresponding to the image 1018 to the projector subsystem 832. To represent the image 1018, the projector subsystem 832 can project light onto a surface of the user's palm 1026. In some implementations, the projector subsystem 832 projects light onto other surfaces such as walls, the ground, among others.

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor. Method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random-access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example, semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits). To provide for interaction with a user the features may be implemented on a computer having a display device such as a CRT (cathode ray tube), LED (light emitting diode) or LCD (liquid crystal display) display or monitor for displaying information to the author, a keyboard and a pointing device, such as a mouse or a trackball by which the author may provide input to the computer.

One or more features or steps of the disclosed embodiments may be implemented using an Application Programming Interface (API). An API may define on or more parameters that are passed between a calling application and other software code (e.g., an operating system, library routine, function) that provides a service, that provides data, or that performs an operation or a computation. The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API. In some implementations, an API call may report to an application the capabilities of a device running the application, such as input capability, output capability, processing capability, power capability, communications capability, etc.

A number of implementations have been described. Nevertheless, it will be understood that various modifications may be made. Elements of one or more implementations may be combined, deleted, modified, or supplemented to form further implementations. In yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method performed by a computing device, the method comprising:
    obtaining an image captured using a camera coupled to a wearable multimedia device;
    comparing the image to one or more known images;
    based on comparing the image to the one or more known images, identifying one or more target features in the image;
    modifying the image by extracting a portion of the image that includes the one or more target features;
    generating a new image using the modified image; and
    providing the new image to the wearable multimedia device for presentation on a display associated with the wearable multimedia device.

2. The method of claim 1, comprising:
    based on comparing the image to the one or more known images, determining a matching image of the one or more known images that best matches the image captured using the camera;
    determining one or more features in the matching image; and
    based on determining the one or more features in the matching image, identifying the one or more target features in the image, wherein at least one of the one or more target features corresponds to at least one of the one or more features in the matching image.

3. The method of claim 2, wherein determining the matching image of the one or more known images that best matches the image captured using the camera comprises:
    comparing the one or more features of the matching image to the one or more target features in the image.

4. The method of claim 1, wherein the one or more known images includes a reference image designated by a user of the wearable multimedia device and the one or more target features include one or more features within the reference image, the method further comprising:
    based at least on receiving a designation of the reference image by the user of the wearable multimedia device, analyzing the reference image;
    identifying, based on the analysis, the one or more features in the reference image;
    for each feature of the one or more features:
        determining one or more parameters;
        comparing the one or more parameters to respective threshold values; and
        upon determining that the one or more parameters satisfy the respective threshold values, selecting the feature as a target feature.

5. The method of claim 1, wherein the one or more target features include an indication of whether or not a face of a person in a captured image is facing the camera.

6. The method of claim 1, wherein providing the new image for presentation on the display comprises:
    projecting, using the wearable multimedia device, the new image on a display surface that is physically detached from the wearable multimedia device, wherein the display surface comprises one of a surface of a hand of a user, a palm of a user, a wrist of a user, a tabletop, a wall, a portion of glass, or a portion of ground.

7. The method of claim 1, wherein the computing device is a server that is communicably coupled to the wearable multimedia device.

8. The method of claim 1, wherein the computing device is the wearable multimedia device.

9. The method of claim 1, comprising:
generating a higher resolution version of the image captured using the camera coupled to the wearable multimedia device, wherein generating the higher resolution version of the image comprises:
providing the image to a machine learning model; and
generating the higher resolution version of the image based on obtained output from the machine learning model.

10. The method of claim 1, wherein modifying the image by extracting the portion of the image that includes the one or more target features includes cropping the image.

11. The method of claim 10, comprising cropping the image corresponding to a predetermined aspect ratio using the one or more target features.

12. The method of claim 1, wherein obtaining the image captured using the camera coupled to the wearable multimedia device comprises obtaining a wide view image represented by a first dimension, and
wherein the new image is represented by a second dimension that is less than the first dimension.

13. The method of claim 1, wherein the one or more target features include an indication of at least one of:
whether or not the image includes background objects,
one or more subjects or objects to be kept in focus,
subjects or objects of interest, or
subjects or objects not of interest.

14. The method of claim 1, further comprising:
receiving input from a user of the wearable multimedia device indicating that the new image includes low quality features; and
in response to the input from the user indicating that the new image includes the low quality features, adjusting parameters of one or more trained machine learning models that are used to generate the new image.

15. The method of claim 14, wherein the low quality features include blurriness or incorrect cropping.

16. The method of claim 1, wherein providing the new image to the wearable multimedia device for presentation on the display associated with the wearable multimedia device comprises:
presenting the new image on the display associated with the wearable multimedia device using one of a laser projector of the wearable multimedia device, Liquid Crystal on Silicon (LCOS) technology, Digital Light Processing (DLP) technology, Liquid Chrystal Display (LCD) technology, or an external projector that is coupled to the wearable multimedia device.

17. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
obtaining an image captured using a camera coupled to a wearable multimedia device;
comparing the image to one or more known images;
based on comparing the image to the one or more known images, identifying one or more target features in the image;
modifying the image by extracting a portion of the image that includes the one or more target features;
generating a new image using the modified image; and
providing the new image to the wearable multimedia device for presentation on a display associated with the wearable multimedia device.

18. The system of claim 17, the operations comprising:
based on comparing the image to the one or more known images, determining a matching image of the one or more known images that best matches the image captured using the camera;
determining one or more features in the matching image; and
based on determining the one or more features in the matching image, identifying the one or more target features in the image, wherein at least one of the one or more target features corresponds to at least one of the one or more features in the matching image.

19. The system of claim 18, wherein determining the matching image of the one or more known images that best matches the image captured using the camera comprises:
comparing the one or more features of the matching image to the one or more target features in the image.

20. The system of claim 17, wherein the one or more known images includes a reference image designated by a user of the wearable multimedia device.

21. One or more non-transitory computer-readable media storing instructions that, when executed by at least one processor, cause the at least one processor to perform operations comprising:
obtaining an image captured using a camera coupled to a wearable multimedia device;
comparing the image to one or more known images;
based on comparing the image to the one or more known images, identifying one or more target features in the image;
modifying the image by extracting a portion of the image that includes the one or more target features;
generating a new image using the modified image; and
providing the new image to the wearable multimedia device for presentation on a display associated with the wearable multimedia device.

* * * * *